(12) United States Patent
Look

(10) Patent No.: US 9,272,496 B2
(45) Date of Patent: Mar. 1, 2016

(54) SECURE DEVICES FOR PERSONAL OR ARTICLE IDENTIFICATION, SUCH AS DRIVER'S LICENSES AND VEHICLE LICENSE PLATES, AND METHODS OF PRODUCING SUCH IMPROVED DEVICES

(76) Inventor: Thomas Finley Look, Ramsey, MN (US)

( * ) Notice: Subject to any disclaimer, the term of this patent is extended or adjusted under 35 U.S.C. 154(b) by 123 days.

(21) Appl. No.: 13/586,537

(22) Filed: Aug. 15, 2012

(65) Prior Publication Data

US 2013/0042966 A1 Feb. 21, 2013

Related U.S. Application Data

(60) Provisional application No. 61/575,034, filed on Aug. 15, 2011.

(51) Int. Cl.
| | | |
|---|---|---|
| *B32B 38/00* | (2006.01) | |
| *B32B 37/12* | (2006.01) | |
| *B32B 38/14* | (2006.01) | |
| *B42D 25/00* | (2014.01) | |
| *B60R 13/10* | (2006.01) | |
| *B42D 25/47* | (2014.01) | |

(52) U.S. Cl.
CPC ............... *B32B 37/12* (2013.01); *B42D 25/00* (2014.10); *B32B 38/145* (2013.01); *B32B 2425/00* (2013.01); *B42D 25/47* (2014.10); *B42D 2033/08* (2013.01); *B42D 2033/40* (2013.01); *B42P 2241/22* (2013.01); *B60R 13/10* (2013.01); *Y10T 156/1051* (2015.01)

(58) Field of Classification Search
USPC ........................................................ 156/227
See application file for complete search history.

(56) References Cited

U.S. PATENT DOCUMENTS

| 3,068,140 | A | * | 12/1962 | Biddle .......................... 156/227 |
| 5,788,796 | A | * | 8/1998 | Look et al. ..................... 156/277 |
| 5,818,492 | A | * | 10/1998 | Look .............................. 347/171 |
| 6,869,654 | B2 | * | 3/2005 | Ginkel et al. ................. 428/40.1 |
| 7,261,790 | B2 | * | 8/2007 | Hoffman et al. ............... 156/555 |
| 7,534,476 | B2 | * | 5/2009 | Banks et al. .................. 428/40.1 |
| 7,869,723 | B2 | * | 1/2011 | Koinuma ......................... 399/40 |
| 2005/0189066 | A1 | * | 9/2005 | Look et al. ..................... 156/277 |
| 2006/0234040 | A1 | * | 10/2006 | Liu et al. ......................... 428/343 |
| 2007/0065617 | A1 | * | 3/2007 | Dasher et al. ................. 428/40.1 |
| 2007/0163703 | A1 | * | 7/2007 | Romita .......................... 156/227 |
| 2007/0164505 | A1 | * | 7/2007 | Ishibashi et al. ............... 271/226 |
| 2008/0305285 | A1 | | 12/2008 | Katampe |
| 2011/0111145 | A1 | | 5/2011 | Katampe |

OTHER PUBLICATIONS

*Chemical Demonstrations: A Handbook for Teachers of Chemistry*, by Bassam Z. Shakhashiri, vol. 1 (1983), pp. 241-242.

(Continued)

*Primary Examiner* — Michael N Orlando
*Assistant Examiner* — Marta Dulko
(74) *Attorney, Agent, or Firm* — Kagan Binder, PLLC

(57) ABSTRACT

Methods of personal and article identification and licensing are disclosed. Methods and constructions of cards and plates include driver's license fabrication and production for the purpose of regulating or identifying a driver and assuring their identity and compliance with jurisdictional regulations and license plate fabrication and production for the purpose of regulating or identifying a vehicle and assuring its identity and compliance with jurisdictional regulations. Driver's licenses and license plates are described herein as exemplary embodiments of identification cards and licensing devices that are produced according to certain processes of manufacturing and issuing.

8 Claims, 14 Drawing Sheets

(56) References Cited

OTHER PUBLICATIONS

*Chemical Demonstrations: A Handbook for Teachers of Chemistry*, by Bassam Z. Shakhashiri, vol. 1 (1983), pp. 216-217.

*Chemical Demonstrations: A Handbook for Teachers of Chemistry*, by Bassam Z. Shakhashiri, vol. 1 (1983), pp. 213-214.

*Chemical Demonstrations: A Handbook for Teachers of Chemistry*, by Bassam Z. Shakhashiri, vol. 3 (1989), pp. 368-371.

* cited by examiner

SECURE DEVICES FOR PERSONAL OR ARTICLE IDENTIFICATION, SUCH AS DRIVER'S LICENSES AND VEHICLE LICENSE PLATES, AND METHODS OF PRODUCING SUCH IMPROVED DEVICES

CROSS REFERENCE TO RELATED APPLICATION

This application claims the benefit under 35 U.S.C. §119 (e) of U.S. Provisional Patent Application No. 61/575,034, filed Aug. 15, 2011 and titled "Method and Article for Producing an Improved Secure Driver's License and License Plate", which is incorporated herein by reference in its entirety.

TECHNICAL FIELD

The present invention generally relates to the methods of personal and article identification and licensing methods and more specifically to the methods of driver's license fabrication and production for the purpose of regulating or identifying a driver and assuring their identity and compliance with jurisdictional regulations and license plate fabrication and production for the purpose of regulating or identifying a vehicle and assuring its identity and compliance with jurisdictional regulations. Driver's licenses and license plates are described herein as exemplary embodiments of identification cards and licensing devices that are produced according to certain processes of manufacturing and issuing.

BACKGROUND OF THE PRESENT INVENTION

Driver's licensing and vehicle registration and their identification programs have existed since the onset of vehicle development. The difference today is that the technology is available to assure that the holder of the driver identification means is the correct person and that the vehicle license plate is associated with the correct vehicle. A larger issue in most new programs is how the identification system is going to be implemented and used. (Driver's License (DL) and Vehicle License Plate (LP), together, here after will be termed (DL/LP))

A further issue is what driver's licenses/license plates will have for information storage and security features. There are literally hundreds if not thousands of choices for the driver's license/license plate constructions, as well as for security and communication methods for these devices. Choices will be based on the needs of an issuing authority and other influencing bodies. Most all drivers' licensing authorities will require at least the image of the card holder, some type or method of electronic information storage, an identification method tying the card to an electronic database and card security to prevent fraudulent production. Plate licensing authorities will likely require a vehicle identification number, the issuing body and jurisdiction identification, an expiration date of the license plate and plate security to prevent fraudulent production.

Methods of production can also vary but in general the driver's licenses are produced either in a central location and provided to the customer at some future date or they are made at a local driver's license administration site and immediately given to the customer. The latter method of production is becoming more popular since customer satisfaction is a large issue for governments and immediate delivery is important to the customer. The license plate distribution typically follows the either of the same centralized or local distribution methods of production, although very few jurisdictions actually practice a localized distribution production.

In general, there is only one common production method used in driver's license card production today for large-scale local distribution programs; that is thermal transfer printing using either die sub or mass colorant ribbons. A typical card body is made up using two parts. The first part is a substrate, which is the bulk in the card. The second part is a clear top film or coating to protect the information on the card form abrasion and forgery. Both the substrate and the top film/coating may contain security elements while the substrate usually has the graphic information and occasionally an electronically readable data storage device. Some systems are capable of printing both the front and the back of the card. If electronically readable storage is included on the card, a device to write the information to the electronic storage component will be needed. For card enrollment, additional hardware that may be required can include an electronic cameras for acquiring the card holder's facial image, electronic finger print reader for finger print identification, electronic signature input pad, heat laminators to apply the top film to the substrate, die cutters for cutting the card shape and other pieces of hardware.

A driver's license administration authority can acquire low cost materials that will make a driver's license, which materials are also readily available to local forger. If only the cost of consumables is targeted as the deciding factor, then the system will not be sufficiently secure and the reason for having a licensing device will be defeated. A minimal system should be secure and serve the needs of law enforcement and a driver's license administration.

Problems with the current methods of driver's licensing include:

1. Production security is often inadequate and, as such, license-issuing operators of a driver's license administration can be tempted to illegally issue a driver's license.
2. Production hardware may not be adequate in terms of complexity and cost for some jurisdictions.
3. Even with some security features on a driver's license, they may hard to recognize by an enforcement officer on the street and therefore possible to forge.
4. The visual and electronic data on the driver's license may not adequately identify the correct person.
5. The driver's license may be alterable by illegal means.
6. The cost of consumables used to make a secure driver's license may be too high.
7. The durability of the driver's license may not meet the jurisdictional needs for a long life product.
8. A jurisdiction may want distributed production but use central production for reasons of security, system complexity or costs.
9. When a new driver's license program has been implemented, it can take years to make significant beneficial changes since most programs are just replacement as needed programs, not a total reissue.

Accordingly, what is needed is a driver's license enrollment and personalization program that government agencies around the world can establish including a powerful, trusted and cost-effective platform for enrollment, data preparation and storage, entitlement verification, document production and delivery, and point-of-use verification. Moreover, technology standards are needed for driver's licenses that can meet the needs of drivers and regulatory officers.

License plate programs are generally managed by the same jurisdiction agency as the driver's license programs although they are typically administratively run under different departments. Not surprisingly a number of the same issues exist for license plate programs that are also found in the driver's license programs.

A license plate can be produced in a central location or a distributed location. More so than driver's license programs, it is very difficult to make a secure, durable license plate in distributed locations. A common central production method requires expensive hardware, lots of manufacturing space, many workers and works best when plates are manufactured in sequential order using preprinted background sheeting. For driver's licenses there is an industry of over-the-counter production methods that while costly are available. One production process using readily available materials for license plates includes the use of a handle assembly on a plate using embossed metal and ink roll coating or hot stamp foil to cover embossed characters. The other possibility is die cut characters that are hand laid up on polymer substrates. Neither of these methods includes security features and both such methods are labor intensive and, thus, not often used.

Most often license plates are centrally, sequentially produced and supplied to the vehicle owner at a jurisdictional office or they are mailed to the owner. These plates are costly for a number of reasons and do not work well for jurisdictions that make large profits from vanity and special interest license plates. Vanity and special interest license plates usually have to be ordered from a separate factory as out of sequence and special background plates that are very costly and take a long time, weeks or months, to produce.

License plates also do not do a good job of identifying a class of vehicles. Since a license plate background design can be used to sort classes of vehicles, such as the size of trucks, taxis, police cars, ambulances and the like, it would be beneficial if every plate could have a background, characters and identification data that is specific to a driver and class of vehicles. This is not practical for centrally produced license plates.

Almost no license plate has electronically readable data (that is not otherwise visually discernible) to identify the registered vehicle and allow for automated ticketing and the like.

License plates typically have little or no security. In some jurisdictions a fake plate is less costly to buy than a real plate and stolen plates can be moved to a similar vehicle with little threat of detection. This is caused by the fact that common license plates do not have any graphic data tying the plate to a particular vehicle. Vehicles are involved in some aspect of 60% of crimes and the license plate is an important practical way to identify a given vehicle. Most criminals are smart enough not to use a vehicle with a plate that can be traced back to them.

Just like driver's licenses, license plates production improvement or change requires an overhaul of the production and issuing system used by jurisdictions. The problems that are central to license plates include:
1. Production security is often inadequate and license plate administration operators can be tempted to illegally issue a license plate.
2. Locally distributed license plate production systems are not adequate in terms of complexity, costs, manpower or security for any jurisdiction.
3. It is very difficult for an enforcement officer on the street to determine if a vehicle has a legitimate license plate.
4. Visual and electronic data on a license plate is not adequate to identify the correct vehicle.
5. A license plate may be alterable or produced by fraudulent means.
6. The cost of consumables and production used to make a secure license plate is too high.
7. The durability of a license plate may not meet the jurisdictional needs for a long life product that has the required security, durability and electronically readable data.
8. A jurisdiction may want distributed production but use central production for reasons of security, system complexity or costs.
9. In order to implement a new license plate, it can take years to make significant beneficial changes since most programs are just replacement as needed programs, not a total reissue.

Accordingly, what is needed are license plate construction and personalization solutions, so that government agencies around the world can establish a powerful, trusted and cost-effective platform for vehicle enrollment, data preparation and storage, entitlement verification, document production and delivery, and point-of-use verification.

SUMMARY OF THE PRESENT INVENTION

Methods and devices are disclosed within the subject application that apply to both driver's licenses and the license plates allowing each to exhibit features and benefits that are not available using current materials and processing. Processes of the present invention comprise the use of unique material combinations that allow printing, such as via a standard laser printer, on material combinations that are unique to the motor vehicle market. Such processes are simple, fast, and low cost and use only a small workspace. Processes of the present invention include both hand production techniques suitable for low labor rate jurisdictions and fully automated techniques that are suitable for other jurisdictions. Consumables to be used are also low cost, durable and provide desired legacy features of past systems, as desired. Driver's license production techniques and designs are disclosed herein as well as license plate production techniques and designs. While a laser printer is an exemplary embodiment of a suitable printing device described herein and serves the purpose of illustration only, a suitable printing device could be an ink jet, thermal transfer or other digital printer.

Driver's licenses of the present invention preferably meet the needs of jurisdictional driver's licensing authorities across the world for secure production of a secure driver's license that is durable, fully identifies the driver and is low cost, fast to produce and utilizes common hardware, such as readily available printers. Specific advantages include the following:

Methods and systems of the present invention include security within driver's license production suitable for local distribution that prevents illegal production by driver's license administrations and, in particular, driver's license issuing operators.

Methods and systems of the present invention can include the use of widely available printing devices, such as laser printers, as is preferred and described as follow, as well other printing devices such as office digital printers, thermal transfer printers, ink jet printers and other laser printers without giving up any security, driver identification or durability features.

Methods and systems of the present invention are advantageous in that necessary hardware that can be used to produce a driver's license, either centrally or locally distributed, can be low cost, simple to use, fast and readily available from many sources.

Methods and systems of the present invention can create driver's licenses having security features on the driver's license that are easy to verify by visual observation and that are very difficult and almost impossible to forge.

Methods and systems of the present invention can preferably include a methodology to provide electronically readable data with biometric identification of a driver.

Methods and systems of the present invention include can also include methodology for electronically readable data storage that can be encrypted and highly secure, for preventing illegal dispersal of private data and preventing fraudulent production of a usable driver's license.

Methods and systems of the present invention can create driver's licenses that cannot be altered without the alteration being detectable.

The cost of the production hardware and consumables used to make the driver's licenses in accordance with the present invention can be low without giving up security, driver identification or durability of a driver's license design.

License plates of the present invention preferably meet the needs of jurisdictional vehicle licensing authorities across the world for secure production of a secure license plate that is durable, fully identifies the vehicle and is low cost, fast to produce and utilizes common hardware, such as readily available printers. Specific advantages include the following:

Methods and systems of the present invention can include security within license plate production suitable for local distribution that prevents illegal production by license plate administrations and, in particular license plate issuing operators.

Methods and systems of the present invention can include the use of widely available printing devices, such as laser printers, as is preferred and described as follow, as well other printing devices such as office digital printers, thermal transfer printers, ink jet printers and other laser printers without giving up any security, driver identification or durability features.

Methods and systems of the present invention are advantageous in that necessary hardware that can be used to produce a driver's license, either centrally or locally distributed, can be low cost, simple to use, fast and readily available from many sources.

Methods and systems of the present invention can create driver's licenses having security features on the driver's license that are easy to verify by visual observation and that are very difficult and almost impossible to forge.

Methods and systems of the present invention can preferably include a methodology to provide electronically readable data with positive identification of a vehicle.

Methods and systems of the present invention include can also include methodology for electronically readable data storage that can be encrypted and highly secure, for preventing illegal dispersal of vehicle data and preventing the fraudulent production of a usable license plate.

Methods and systems of the present invention can create license plates that cannot be altered without the alteration being detectable.

The cost of the production hardware and consumables used to make the license plates in accordance with the present invention can be low without giving up security, vehicle identification or durability of a license plate design.

DESCRIPTION OF THE PRESENT INVENTION

Figure 1:
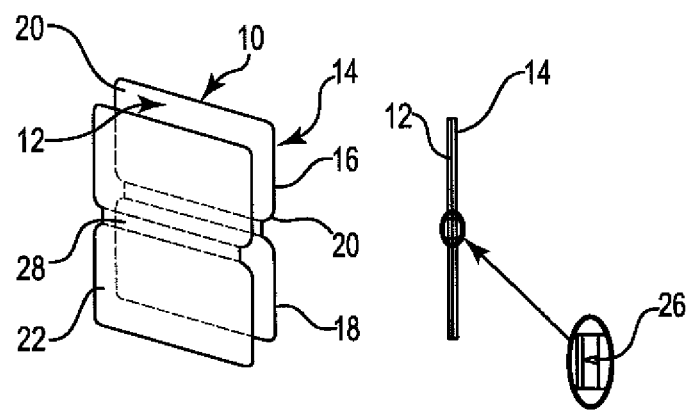
FIG. 1 shows print on substrate with single fold line and tear strip.

The present invention is directed to the construction and features of identification cards, in particular driver's licenses, and methods of producing such identification cards. The description below is primarily directed to driver's licenses with an understanding that the features disclosed herein are equally applicable to any identification card where similar security and identification features are desired, such as to afford a privilege or access or the like to an individual.

The present invention is also directed to the construction and features of identification plates, in particular license plates, and methods of producing such identification plates. The description below is primarily directed to license plates with the understanding that the features disclosed herein are equally applicable to any identification plate as may be used for vehicle or other type of equipment identification as such may be based upon a registration of the vehicle or equipment with any authority. It is also noted that the disclosure below recognizes the use of similar features and materials as are applicable to both identification cards or driver's licenses and to identification plates or license plates as both share similar aspects for registration and control based upon a jurisdictional or authority in issuing such items to individuals.

An aspect of the present invention is the ability to create secure driver's licenses and license plates based upon the availability of easily obtained material and by use of easily obtained equipment, but with security to prevent the problems discussed above.

While the invention disclosed here within can be used with several different digital printers, as a means of printing relevant information, data, symbols, images and the like to the substrates discussed below, a laser printer offers several advantages that are preferred over other printer types that also are contemplated for use according to the present invention, including other common digital printers such as ink jet and dye sub thermal transfer.

The colorants used in laser printers are most often pigment based, having good UV resistance properties, providing longer life when exposed to sun-light. Ink jet and dye sub thermal transfer colorants are usually dye based and do not have as good UV resistant properties as does laser print colorants. Moreover, colorants used in laser printers are most often solid polymers that are fused to the printable substrate using heat and pressure which provides both an abrasion and water resistance surface providing longer life when exposed to environmental conditions in common usage. Ink jet and dye sub thermal transfer colorants are less preferred as not being as resistant to either abrasion or water as the colorants of laser printers. Laser printer colorant will also adhere to a greater variety of materials, particularly polymeric materials, as compared to either ink jet or dye sub thermal transfer printers.

In accordance with a preferred aspect of the present invention, a laser printer fuser can be used to soften a polymer layer on the substrate where a colorant toner can be driven down into said softened polymer layer providing greater protection for the colorant, as such is described in greater detail below. Laser printers also apply colorant dots on a substrate surface more accurately, at up to 2400 dots per inch (DPI), as compared to either an ink jet printer where ink can spread depending on absorption characteristics of the substrate or as compared to a dye sub thermal transfer printer that is commonly limited to 300 DPI.

Certain laser printers use belts to carry the substrate through the printer in a straight path, and as such can provide a better transport mechanism for heavy rigid substrates as compared to ink jet printers that typically are designed with curved paths and utilize drive rollers.

Laser printers as commercially available also have features that can create certain difficulties that are also advantageously dealt with according to aspects of the present invention. For example:

It is difficult to print a substrate more than 0.015 inches thick in a laser printer because as a substrate becomes thicker, print alignment between colorants becomes more offset, and a fuser needs to maintain higher temperatures for thicker materials to provide adequate colorant adhesion to the substrate.

A card, for example that is a standard size such as 3.375 inches by 2.215 inches, is too small to be carried through a laser printer. Also, a fuser roller can adhere to polymers or adhesives with a softening temperature below the fuser temperature. If multilayer substrates are utilized, such multilayer substrates can become curled from differential expansion between layers caused by fuser heat.

While a laser printer can have these difficult in use for producing identification cards, the advantages of using a laser printer are numerous. For example, a laser printer is preferred in that such laser printers are an accurate method of producing graphic content on cards compared to other digital desktop printers, particularly where high precision is required such as is required for printing two-dimensional barcodes, as such are well known. Moreover, colorant toners are more durable as compared to other digital desktop printers, for UV exposure, abrasion and water exposure. Furthermore, a laser printer can be used to effectively printed onto a greater variety of polymeric substrates as compared to other digital desktop printers.

A laser printer such as the OKI C6050, as is commercially available from OKI Data Americas, Inc. of Mount Laurel, N.J., is an exemplary laser printer that is discussed within certain examples that are disclosed below as such examples are provided for describing aspects of inventive processes of the present invention.

Many different substrates are disclosed herein as part suitable components for identification cards or plates in accordance with the present invention. Today the vast majority of ID card substrates are made from layered Polyvinyl Chloride (PVC) and printed with a plastic card printer such as the Datacard SP55+, as such is commercially available from Datacard Corp. of Minneapolis, Minn. USA using dye sub inks coated on a paneled ribbon such as the Datacard Color Photo YMCK Ribbon (P/N 806124-102). In general a PVC only substrate has a life of two to three years. If the PVC card has a polyester core and polyester lamination over at least one surface the life can be extended to five and possibility seven years. PVC cards, however, are generally quite rigid and can be cumbersome if several are housed in an individual's wallet.

Problems associated with the use of PVC substrates for cards or plates include that PVC is not preferred as material that is suitable for disposal in a land fill. Moreover, PVC cards are typically printed with a 300 DPI print head using dye sub inks creating a low resolution image of short lived inks. Common PVC cards generally have a short life and tend to crack and break apart if flexed in a wallet over a period of time. If a more durable construction is used, as noted above, the costs escalate quickly to card printing consumable costs of 5 times that of cards of the present invention, which subject cards exhibit better durability and features as discussed further below.

A plastic card printer can be a complicated device that must flip the card (Duplex) during the processing if two-sided printing is required. Moreover, a duplex plastic card printer costs about 5 times that of a common color laser printer.

Exemplary substrates of the present invention are preferably in a class of substrates that differ by application. Substrate types of the present invention preferably include an opaque substrate and a clear substrate. While a clear PVC film is certainly an example of a polymer film that would be a potential clear substrate, others substrates can have better characteristics. Another exemplary clear substrate is a High Density Polyethylene (HDPE) film. There are many other clear polymer films that may work better for a particular application, which applications will be discussed in more detail below. An exemplary opaque substrate is a class of polymer films known as poly-paper. A specific exemplary product is Teslin, a product of PPG Corporation, One PPG Place Pittsburgh, Pa. USA.

Preferably, both the opaque and transparent layers or substrates should have certain characteristics to provide a quality product as follows.

A substrate will preferably either provide a good surface for receiving toner colorant of a laser printer or the inks of other printers or have good adhesion to a colorant adhesive that can receive toner colorant of a laser printer or the inks of other digital printers. It is more preferable, that a substrate surface or colorant adhesive be of a quality so as to effectively be able to receive printed colorant at a minimum of 600 DPI graphics.

A substrate or colorant adhesive will also preferably have thermal qualities that allow the proper heat transfer for providing good bonding of laser toner colorant.

A substrate will also preferably have the direct ability to protect the colorant from abrasion or a colorant adhesive can have the ability to protect the colorant from abrasion or the substrate can be transparent with the colorant on a non-exposed surface of the substrate. It is also preferable that a substrate will withstand the heat of the laser printer without damage or physical changes to the substrate or without sticking to rollers or other components in the printer. A suitable substrate will also have good bonding characteristics to a substrate adhesive, as may be used as described below. If utilized along with a magnetic stripe, as conventionally know, a substrate should preferably also have a sufficient rigidity to provide a capability of magnetic stripe reading and maintaining an original shape after being curled or otherwise similarly abused. It is also preferred that a suitable substrate have durability to provide a minimum of five year service life when subjected to sun light and normal abrasive, handling and chemical abuses common to ID cards.

Based upon the above preferred characteristics for suitable substrate materials, as such materials can be provided for either or both of transparent or opaque material layers, a discussion follows of certain specific materials having at least one or more aspects of suitability for any one or more of layers of materials in accordance with the present invention. It is understood as well that other materials may be just as suitable or better that can otherwise be used in accordance with aspects of the present invention based upon the desired characteristics discussed above and an understanding of the qualities of the materials discussed below.

Olyethylene terephthalate—Polyethylene terephthalate (PET), or polyethylene terephthalic ester (PETE), is a condensation polymer produced from the monomers ethylene glycol, $HOCH_2CH_2OH$, a dialcohol, and dimethyl terephthalate, $CH_3O_2C—C_6H_4-CO_2CH_3$, a diester. By the process of transesterification, these monomers form ester linkages between them, yielding a polyester. PETE fibers are manufactured under the trade names of Dacron and Fortrel. Pleats and creases can be permanently heat set in fabrics containing polyester fibers, so-called permanent press fabrics. PETE can also be formed into transparent sheets and castings. Mylar is a trade name for a PETE film. transparent 2-liter carbonated beverage bottles are made from PETE. (The opaque base on some bottles is generally made of HDPE.) One form of PETE is the hardest known polymer and is used in eyeglass lenses.

Polyethylene—Polyethylene is perhaps the simplest polymer, composed of chains of repeating —$CH_2$- units. It is produced by the addition polymerization of ethylene, $CH_2=CH_2$ (ethene). The properties of polyethylene depend on the manner in which ethylene is polymerized. When catalyzed by organometallic corn pounds at moderate pressure (15 to 30 atm), the product is high density polyethylene, HDPE. Under these conditions, the polymer chains grow to very great length, and molar masses average many hundred thousands. HDPE is hard, tough, and resilient. Most HDPE is used in the manufacture of containers, such as milk bottles and laundry detergent jugs. When ethylene is polymerized at high pressure (1000-2000 atm), elevated temperatures (190-210° C.), and catalyzed by peroxides, the product is low density polyethylene, LDPE. This form of polyethylene has molar masses of 20,000 to 40,000 grams. LDPE is relatively soft, and most of it is used in the production of plastic films, such as those used in sandwich bags.

Polyvinyl chloride—Polymerization of vinyl chloride, $CH_2=CHCl$ (chloroethene), produces a polymer similar to polyethylene, but having chlorine atoms at alternate carbon atoms on the chain. Polyvinyl chloride (PVC) is rigid and somewhat brittle. About two-thirds of the PVC produced annually is used in the manufacture of pipe. It is also used in the production of "vinyl" siding for houses and clear plastic bottles. When it is blended with a plasticizer such as a phthalate ester, PVC becomes pliable and is used to form flexible articles such as raincoats and shower curtains.

Polypropylene—This polymer is produced by the addition polymerization of propylene, $CH_2=CHCH_3$ (propene). Its molecular structure is similar to that of polyethylene, but has a methyl group (—$CH_3$) on alternate carbon atoms of the chain. Its molar masses falls in the range 50,000 to 200,000 grams. Polypropylene (PP) is slightly more brittle than polyethylene, but softens at a temperature about 40° C. higher. Polypropylene is used extensively in the automotive industry for interior trim, such as instrument panels, and in food packaging, such as yogurt containers. It is formed into fibers of very low absorbance and high stain resistance, used in clothing and home furnishings, especially carpeting.

Polystyrene—Styrene, $CH_2=CH—C_6H_5$, polymerizes readily to form polystyrene (PS), a hard, highly transparent polymer. The molecular structure is similar to that of polypropylene, but with the methyl groups of polypropylene replaced by phenyl groups (—$C_6H_5$). A large portion of production goes into packaging. The thin, rigid, transparent containers in which fresh foods, such as salads, are packaged are made from polystyrene. Polystyrene is readily foamed or formed into beads. These foams and beads are excellent thermal insulators and are used to produce home insulation and containers for hot foods. Styrofoam is a trade name for foamed polystyrene. When rubber is dissolved in styrene before it is polymerized, the polystyrene produced is much more impact resistant. This type of polystyrene is used extensively in home appliances, such as the interior of refrigerators and air conditioner housing. [For more information about this polymer, see Chemical Demonstrations: A Handbook for Teachers of Chemistry, by Bassam Z. Shakhashiri, Volume 1 (1983), page 241.]

Polytetrafluoroethylene—Teflon is a trade name of polytetrafluoroethylene, PTFE. It is formed by the addition polymerization of tetrafluoroethylene, CF2=CF2 (tetrafluoroethene). PTFE is distinguished by its complete resistance to attack by virtually all chemicals and by its slippery surface. It maintains its physical properties over a large temperature range, −270° to 385° C. These properties make it especially useful for components that must operate under harsh chemical conditions and at temperature extremes. Its most familiar household use is as a coating on cooking utensils.

Polyurethane—This important class of polymers is formed by the addition polymerization of a diisocyanate (whose molecules contain two —NCO groups) and a dialcohol (two —OH groups). The polymer chain is linked by urethane groups (—O—CO—NH—). The —NH— portion of the urethane group can react similarly to an —OH group, producing cross-linking between polymer chains. Polyurethane is spun into elastic fibers, called spandex, and sold under the trade name Lycra. Polyurethane can also be foamed. Soft polyurethane foams are used in upholstery, and hard foams are used structurally in light aircraft wings and sail boards. The formation of some polyurethane (and polystyrene) foams exploits the exothermic nature of the polymerization reaction. A liquid with a low boiling point, called a blowing agent, is added to the monomers before the polymerization starts. As the polymerization proceeds, it releases enough heat to boil the liquid. The boiling liquid produces bubbles that create a foam. In the past, the most commonly used low-boiling liquids were chlorofluorocarbons. However, the damaging effect of chlorofluorocarbons on the stratospheric ozone layer has eliminated their use. Other low-boiling liquids have other disadvantages, such as flammability. Therefore, most polyurethane and polystyrene foams are manufactured by forcing a pressurized gas, such as nitrogen or carbon dioxide, into the polymerizing mixture. [For more information about this polymer, see Ibid., Volume 1, page 216.]

Polyamide—Polyamides are a group of condensation polymers commonly known as nylon. Nylon is made from two monomers, one a dichloride and the other a diamine. One particular nylon is made from 1,6-diaminohexane, NH2 (CH2)6NH2 and sebacoyl chloride, ClCO(CH2)8COCl. When these polymerize, the resulting molecules contain repeating units of —NH(CH2)6NH—CO(CH2)8CO—. Molecules of HCl are released during the polymerization. This particular polymer is called nylon 6-10 because it contains alternating chains of 6 and 10 carbon atoms between nitrogen atoms. Nylon can be readily formed into fibers that are strong and long wearing, making them well suited for use in carpeting, upholstery fabric, tire cords, brushes, and turf for athletic fields. Nylon is also formed into rods, bars, and sheets that are easily formed and machined. In this form, nylon is used for gears and for automobile fuel tanks. [For more information about this polymer, see Ibid., Volume 1, page 213.]

Polyacrylamide—Polyacrylamide is a condensation polymer with an unusual and useful property. The structure of polyacrylamide is similar to that of polyethylene, but having a hydrogen on every other carbon replace by an amide group, —CONH2. The molecule is composed of repeating —CH2-CH(CONH2)- units. The amide groups allow for linking between polymer strands. The —CONH2 group from one molecule can react with the same group of another molecule, forming a link between them with the structure —CON-HCO—. This produces a network of polymer chains, rather like a tiny sponge. The free, unlinked amide groups, because they contain —NH2 groups, can form hydrogen bonds with water. This gives the tiny cross linked sponges a great affinity for water. Polyacrylamide can absorb many times its mass in water. This property is useful in a variety of applications, such as in diapers and in potting soil. The polyacrylamide will release the absorbed water if a substance that interferes with hydrogen bonding is added. Ionic substances, such as salt, cause polyacrylamide to release its absorbed water. [For more information about this polymer, see Ibid., Volume 3 (1989), page 368.]

There are many colorant and substrate adhesives available that meet the objectives of the driver's licenses and license plates according to the present invention. The needs of a particular project will determine which combination of chemicals and processing, some of which are listed below, will provide the best set of capabilities for the project. Some of these preferred capabilities of colorant and substrate adhesive include the following aspects similar to those above with respect to suitable substrate materials.

Colorant adhesives should preferably provide a good surface for receiving toner colorant of a laser printer or the inks of other digital printers. A colorant adhesive quality of reception of the printed colorant will preferably allow a minimum of 600 DPI graphics. A colorant adhesive should also have thermal qualities that allow for a proper heat transfer so as to provide good bonding of laser toner colorant. Preferred colorant adhesives will also withstand the heat of a laser printer without damage or physical changes to the adhesive or sticking to or transferring residue to rollers or other components in the printer.

Colorant adhesives can also have the direct ability to protect the colorant from abrasion. Preferably, also, a colorant adhesive will be resistant to damage from chemicals, such as those used when washing clothes and other chemicals that are commonly used every day for ordinary activities.

If it is desirable to combine a magnetic strip as will known with such a card or plate, colorant adhesives may also have the rigidity and chemical properties to provide the capability of adhering to and allow reading of a magnetic stripe and maintaining its original shape after being curled, immersed in water or otherwise similarly abused.

A substrate adhesive will preferably have good bonding characteristics to the substrate, and such a substrate adhesive should also have good bonding characteristics to itself.

A substrate adhesives also will preferably withstand the heat of a laser printer without damage or physical changes to the adhesive or sticking to or transferring residue to rollers or other components in the printer. Such preferred substrate adhesives will have resistance to damage from chemicals, such as those used when washing clothes and other chemicals that are commonly used every day for ordinary activities. More preferably, a substrate adhesive will be able to have the rigidity and chemical properties to provide the capability of maintaining its original shape after being curled, immersed in water or otherwise similarly abused.

Preferably also, both colorant and substrate adhesives will exhibit an effective durability to provide a minimum five year service life when subjected to sun light and normal abrasive, handling and chemical abuses common to ID cards.

Based upon the above preferred characteristics for suitable colorant and substrate adhesives, as such materials can be utilized within the layered constructions of the present invention as described below, a discussion follows of certain specific materials having at least one or more aspects of suitability for any one or more of layers of materials in accordance with the present invention. It is understood as well that other materials may be just as suitable or better that can otherwise be used in accordance with aspects of the present invention based upon the desired characteristics discussed above and an understanding of the qualities of the materials discussed below.

Ethylene-vinyl acetate (EVA) copolymers, low-performance, the low-cost and most common material. They provide sufficient strength between 30-50° C. but are limited below 60-80° C. and have low creep resistance under load. The vinyl acetate monomer content is about 18-29 percent by weight of the polymer. High amounts of tackifiers and waxes are often used; an example composition is 30-40% of EVA copolymer (provides strength and toughness), 30-40% of tackifier resin (improves wetting and tack), 20-30% of wax (usually paraffin-based; reduces viscosity, alters setting speed, reduces cost), and 0.5-1% of stabilizers. Fillers can be added for special applications. Can be formulated for service temperatures ranging from −40° C. to +80° C., and for both short and long open times and a wide range of melt viscosities. High stability at elevated temperatures and resistance to ultraviolet radiation, which can be further enhanced with suitable stabilizers. High vinylacetate content can serve for formulating a hot-melt pressure sensitive adhesive (HMPSA). EVA formulations are compatible with paraffin. EVA was the base for the original hot melt composition. The composition of the copolymer influences its properties; increased content of ethylene promotes adhesion to nonpolar substrates, e.g. polyethylene, while increased content of vinyl acetate promotes adhesion to polar substrates, e.g. paper. Higher ethylene content also increases mechanical strength, block resistance, and paraffin solubility. Higher vinyl acetate content provides higher flexibility, adhesion, hot tack, and better low-temperature performance. Adhesive grade EVA usually contains 14-35% vinyl acetate. Lower molecular weight chains provide lower melt viscosity, better wetting, and better adhesion to porous surfaces. Higher molecular weights provide better cohesion at elevated temperatures and better low-temperature behavior. Increased ratio of vinyl acetate lowers the crystallinity of the material, improves optical clarity, flexibility and toughness, and worsens resistance to solvents. EVA can be crosslinked by e.g. peroxides, yielding a thermosetting material. EVAs can be compounded with aromatic hydrocarbon resins. Grafting butadiene to EVA improves its adhesion. Its dielectric properties are poor due to high content of polar groups, the dialectric loss is moderately high. Polypropylene HMAs are a better choice for high-frequency electronics. EVAs are optically clearer and more gas and vapor permeable than polyolefins. Nearly half of EVA HMAs is used in packaging applications. Cryogenic grinding of EVAs can provide small, water-dispersible particles for heat-seal applications. EVA can degrade primarily by loss of loss of acetic acid and formation of a double bond in the chain, and by oxidative degradation. EVA can be compounded into a wide range of HMAs, from soft pressure-sensitive adhesives to rigid structural adhesives for furniture construction.

Ethylene-acrylate copolymers have lower glass transition temperature and higher adhesion even to difficult substrates than EVA. Better thermal resistance, increased adhesion to metals and glass. Suitable for low temperature use. Ethylene-vinylacetate-maleic anhydride and ethylene-acrylate-maleic anhydride terpolymers offer very high performance. Examples are ethylene n-butyl acrylate (EnBA), ethylene-acrylic acid (EAA) and ethylene-ethyl acetate (EEA).

Polyolefins (PO) (polyethylene (usually LDPE but also HDPE; HDPE has higher melting point and better temperature resistance), atactic polypropylene (PP or APP), polybutene-1, oxidized polyethylene, etc.), low-performance, for difficult-to-bond plastics. Very good adhesion to polypropylene, good moisture barrier, chemical resistance against polar solvents and solutions of acids, bases, and alcohols. Longer open time in comparison with EVA and polyamides. Polyolefins have low surface energy and provide good wetting of most metals and polymers. Polyolefins made by metallocene catalyzed synthesis have narrow distribution of molecular weight and correspondingly narrow melting temperature range. Due to the relatively high crystallinity, polyethylene-based glues tend to be opaque and, depending on additives, white or yellowish. Polyethylene hot melts have high pot life stability, are not prone to charring, and are suitable for moderate temperature ranges and on porous non-flexible substrates. Nitrogen or carbon dioxide can be introduced into the melt, forming a foam which increases spreading and open time and decreases transfer of heat to the substrate, allowing use of more heat-sensitive substrates; polyethylene-based HMAs are usually used. Foamable HMAs are available on the market since 1981. Amorphous polypropylene HMAs have good dielectric properties, making them suitable for use at high frequencies. PE and APP are usually used on their own or with just a small amount of tackifiers (usually hydrocarbons) and waxes (usually paraffins or microcrystalline waxes, for lower cost, improved anti-blocking, and altered open time and softening temperature). The molecular weight of the polymer is usually lower. Lower molecular weights provide better low-temperature performance and higher flexibility, higher molecular weights increase the seal strength, hot tack, and melt viscosity.

Polybutene-1 and its copolymers are soft and flexible, tough, partially crystalline, and slowly crystallizing with long open times. The low temperature of recrystallization allows for stress release during formation of the bond. Good bonding to nonpolar surfaces, worse bonding to polar ones. Good for rubber substrates. Can be formulated as pressure-sensitive.

Amorphous polyolefin (APO/APAO) polymers are compatible with many solvents, tackifiers, waxes, and polymers; they find wide use in many adhesive applications. APO hot melts have good fuel and acid resistance, moderate heat resistance, are tacky, soft and flexible, have good adhesion and longer open times than crystalline polyolefins. APOs tend to have lower melt viscosity, better adhesion, longer open times and slow set times than comparable EVAs. Some APOs can be used alone, but often they are compounded with tackifiers, waxes, and plasticizers (e.g. mineral oil, poly-butene oil). Examples of APOs are e.g. amorphous (atactic) propylene (APP), amorphous propylene/ethylene (APE), amorphous propylene/butene (APB), amorphous propylene/hexene (APH), amorphous propylene/ethylene/butene. APP is harder than APE, which is harder than APB, which is harder than APH, in accordance with decreasing crystallinity. APOs show relatively low cohesion, the entangled polymer chains have fairly high degree of freedom of movement. Under mechanical load, most of the strain is dissipated by elongation and disentanglement of polymer chains, and only a small fraction reaches the adhesive-substrate interface. Cohesive failure is therefore a more common failure mode of APOs.

Polyamides and Polyesters, High-Performance

Polyamides (PA), high-performance, for severe environments; high-temperature glues; typically applied at over 200° C., but can degrade and char during processing. In molten state can somewhat degrade by atmospheric oxygen. High application temperature. High range of service temperatures, generally showing adequate bonding from −40 to 70° C.; some compositions allow operation to 185° C. if they do not have to carry load. Resistant to plasticizers, therefore suitable for gluing polyvinyl chloride; only polyamides derived from secondary diamines however provide a satisfying bond. Resistant to oils and gasoline. Good adhesion to many substrates, e.g. metal, wood, vinyl, ABS, and treated polyethylene and polypropylene. Some formulations are UL-approved for electrical applications requiring reduced flammability.

Three groups are employed, with low, intermediate, and high molecular weight; the low MW ones are low-temperature melting and easy to apply, but have lower tensile strength, lower tensile-shear strength, and lower elongation than the high-MW ones. The high-MW ones require sophisticated extruders and are used as high-performance structural adhesives. The presence of hydrogen bonds between the polymer chains gives polyamides a high strength at even low molecular weights, in comparison with other polymers. Hydrogen bonds also provide retention of most of the adhesive strength up almost to the melting point; however they also make the material more susceptible to permeation of moisture in comparison with polyesters. Can be formulated as soft and tacky or as hard and rigid. Niche applications, together with polyesters taking less than 10% of total volume of hot melt adhesives market. Absorption of moisture may lead to foaming during application as water evaporates during melting, leaving voids in the adhesive layer which degrade mechanical strength. Polyamide HMAs are usually composed of a dimer acid with often two or more different diamines. The dimer acid usually presents 60-80% of the total polyamide mass, and provides amorphous nonpolar character. Linear aliphatic amines, e.g. ethylene diamine and hexamethylene diamine, provide hardness and strength. Longer chain amines, e.g. dimer amine, reduce the amount of hydrogen bonds per volume of material, resulting in lower stiffness. Polyether diamines provide good low-temperature flexibility. Piperazine and similar diamines also reduce the number of hydrogen bonds. Only polyamides based on piperazine and similar secondary amines form satisfactory bond with polyvinyl chloride; primary amines form stronger hydrogen bonds within the adhesive, secondary amines can act only as proton acceptors, don't form hydrogen bonds within the polyamide, and are therefore free to form weaker bonds with vinyl, probably with the hydrogen atom adjanced to the chlorine.

Polyesters, similar to the ones used for synthetic fibers. High application temperature. Synthetized from a diol and a dicarboxylic acid. The length of the diol chain has major influence to the material's properties; with increasing diol chain length the melting point increases, the crystallization rate increases, and the degree of crystallization decreases. Both the diol and acid influence the melting point. In comparison with similar polyamides, due to absence of hydrogen bonds, polyesters have lower strength and melting point, but are much more resistant to moisture, though still susceptible. In other parameters, and in applications where these factors do not play a role, polyesters and polyamides are very similar. Polyesters are often used for bonding fabrics. They can be used on their own, or blended with large amounts of additives. They are used where high tensile strength and high temperature resistance are needed. Most polyester hot melt adhesives have high degree of crystallinity. Niche applications, together with polyamides taking less than 10% of total volume of hot melt adhesives market. Water-dispersible amorphous polymers, modified by addition of sodium sulfonate groups for dispersability, were however developed for repulpable adhesives. Polyesters are often highly crystalline, leading to narrow melting temperature range, which is advantageous for high-speed bonding.

Polyurethanes

Thermoplastic polyurethane (TPU) offer good adhesion to different surfaces due to presence of polar groups. Their low glass transition temperature provides flexibility at low temperatures. They are highly elastic and soft, with wide possible crystallization and melting point ranges. Polyurethanes consist of long linear chains with flexible, soft segments (diisocyanate-coupled low-melting polyester or polyether chains) alternating with rigid segments (diurethane bridges resulting from diisocyanate reacting with a small-molecule glycol chain extender). The rigid segments form hydrogen bonds with rigid segments of other molecules. Higher ratio of soft to hard segments provides better flexibility, elongation, and low-temperature performance, but also lower hardness, modulus, and abrasion resistance. The bonding temperature is lower than with most other HMAs, only about 50-70° C., when the adhesive behaves as a soft rubber acting as a pressure-sensitive adhesive. The surface wetting in this amorphous state is good, and on cooling the polymer crystallizes, forming a strong flexible bond with high cohesion. Choice of a proper diisocyanate and polyol combination allows tailoring the polyuretane properties; they can be used on their own or blended with a plasticizer. Polyurethanes are compatible with most common plasticizers, and many resins.

Polyurethanes (PUR), or reactive urethanes, for high temperatures and high flexibility. New type of hot melt thermosetting adhesives, introduced in early 1990s. Solidification can be rapid or extended in range of several minutes; secondary curing with atmospheric or substrate moisture then continues for several hours, forming cross-links in the polymer. Excellent resistance to solvents and chemicals. Low application temperature, suitable for heat-sensitive substrates. heat-resistant after curing, with service temperatures generally from −30° C. to +150° C. ink-solvent resistant. Often used in bookbinding, automotive, aerospace, filter and plastic bag applications. Susceptible to UV degradation causing discoloring and degradation of mechanical properties, requires blending with UV stabilizers and antioxidants. Usually based on prepolymers made of polyols and methylene diphenyl diisocyanate (MDI) or other diisocyanate, with small amount of free isocyanate groups; these groups when subjected to moisture react and cross-link. The uncured solidified "green" strength tends to be low than non-reactive HMAs, mechanical strength develops with curing. Green strength can be improved by blending the prepolymer with other polymers.

Styrene block copolymers (SBC), also called styrene copolymer adhesives and rubber-based adhesives, have good low-temperature flexibility, high elongation, and high heat resistance. Frequently used in pressure sensitive adhesive applications, where the composition retains tack even when solidified; however non-pressure-sensitive formulations are also used. High heat resistance, good low-temperature flexibility. Lower strength than polyesters. They usually have A-B-A structure, with an elastic rubber segment between two rigid plastic endblocks. High-strength film formers as standalone, increase cohesion and viscosity as an additive. Water-resistant, soluble in some organic solvents; cross-linking improves solvent resistance. resins associating with endblocks (cumarone-indene, α-methyl styrene, vinyl toluene, aromatic hydrocarbons, etc.) improve adhesion and alter viscosity. Resins associating to the midblocks (aliphatic olefins, rosin esters, polyterpenes, terpene phenolics) improve adhesion, processing and pressure-sensitive properties. Addition of plasticizers reduces cost, improves pressure-sensitive tack, decrease melt viscosity, decrease hardness, and improve low-temperature flexibility. The A-B-A structure promotes a phase separation of the polymer, binding together the endblocks, with the central elastic parts acting as cross-links; SBCs do not require additional cross-linking.

Styrene-butadiene-styrene (SBS), used in high-strength PSA applications

Styrene-isoprene-styrene (SIS), used in low-viscosity high-tack PSA applications Styrene-ethylene/butylene-styrene (SEBS), used in low self-adhering non-woven applications Styrene-ethylene/propylene (SEP)

Polycaprolactone with soy protein, using coconut oil as plasticizer, a biodegradable hot-melt adhesive investigated at Korea University.

Polycarbonates

Fluoropolymers, with tackifiers and ethylene copolymer with polar groups.

Silicone rubbers, undergo cross-linking after solidification, form durable flexible UV and weather resistant silicone sealant.

Thermoplastic Elastomers

Polypyrrole (PPY), a conductive polymer, for intrinsically conducting hot melt adhesives (ICHMAs), used for EMI shielding. EVA compounded with 0.1-0.5 wt. % PPY are strongly absorbing in near infrared, allowing use as near-infrared activated adhesives.

An example of a colorant and substrate adhesive that is suitable for use according to aspects of the present invention is specialty heat-activated, resin dispersion XLT001 from IYATECH Company of Miamisburg, Ohio, USA. XLT-resin systems are specialty resin blends of polyester resins, polyacrylic ester resins, polycarbonate resins, polyvinyl acetate resins, styrene-acrylate resins, vinyl toluene-acrylate resins and the like with resins having urethane bonds, such as polyurethane resins and the like. The use and description of these resin dispersions blends are found in the United States published patent application nos. 2011/0111145 and 2008/0305285, both in the name of Katampe et al, which disclosures are hereby fully incorporated herein by reference.

In general, the same set of substrate and adhesives properties is common to construction features and production of license plates as well as to driver's licenses. The substrate or substrates that can be used within such constructions can have the same characteristics but may be a different set of polymers while the same listed class of adhesives above can be used for either or both. Both license plates and driver's licenses have a similar preferred need for being processed in a laser or other digital printer and preferably providing a minimum five year service life when subjected to sun light and normal abrasive, handling and chemical abuses common to license plates and driver's licenses. A further discussion of the license plate preferred properties is discussed below, which is similar to the discussion of driver's license preferred properties discussed above.

A license plate substrate will preferably have a base material to provide rigidity, such as a metal, e.g. aluminum, or a polymer such as Acrylonitrile butadiene styrene (ABS). A base material will normally range from 0.024 inches to 0.125 inches thick depending on the material composition and the requirements of the jurisdiction specifying the license plate. laminated to or coated on the base material will preferably be a film or paint that provides a background for any license plate graphics. This film can be either a polymeric material such as Polyvinyl Chloride (PVC) or a retroreflective construction such as are commercially available from 3M Company, of St Paul, Minn. USA, e.g. reflective license plate sheeting #4770.

In one version of a construction for license plates, license plate graphics can be printed directly on a PVC layer or reflective sheeting or other polymer sheeting using a solvent-type ink jet printer, laser printer or by other digital printers. A printed surface may have a colorant adhesive to help the printing process and provide protection for the printed graphics. In an alternative construction, license plate graphics can be printed mirror image on a clear PVC or other clear polymer top film that may also be coated with a colorant and substrate adhesive, using an ink jet, laser or other digital printer. A printed clear film can then be laminated to a base license plate substrate using the colorant and substrate adhesive. Where the former noted construction has graphics directly exposed to the environment, the latter noted construction has graphics that are buried under a clear top film which provides a longer life but has higher costs in additional materials and processing steps.

With reference to the attached drawings illustrating multiple embodiments in accordance with the present invention, wherein like components are labeled with like numerals throughout the several figures, driver's license constructions, license plate constructions, methods of making driver's licenses and methods of making license plates are further described as follows.

Figure 2:
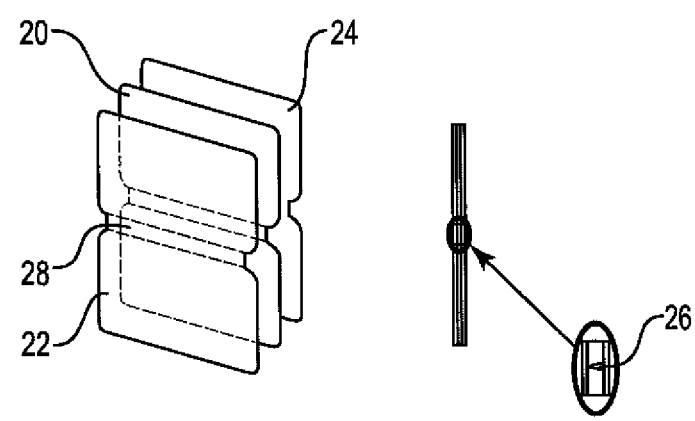
FIG. 2 shows print on colorant adhesive with single fold line and tear strip.

With reference to FIG. 1, a first construction for an identification card, such as a driver's license, preferably comprises a rectangular substrate 10 having a first surface 12 and a second surface 14, where the substrate 10 is preferably is divided into at least two panels or sections 16 and 18. Preferably, the substrate 10 includes die cut rounded corners 20 for each section 16, 18 of the substrate 10. The first surface 12 is illustrated as having a heat activated substrate adhesive layer 22. For proposed construction under a preferred production method of the present invention, the substrate adhesive layer 22 preferably has a higher activation temperature that is higher than an expected temperature that will be transferred to the substrate adhesive layer 22 by way of a fuser roller of a laser printer to be used in production. The substrate adhesive 22 should also exhibit good adhesion to the substrate 10, and under certain circumstances to itself and/or another layer of substrate adhesive or other layer as may be provided. The second substrate surface 14 can be uncoated or the second substrate surface can be coated, such as with a heat activated colorant adhesive 24, as shown in FIG. 2, also preferably having a heat activation temperature that is higher than an expected temperature expected to be transferred to the colorant adhesive 24 by a fuser roller of a laser printer to be used in production. The colorant adhesive 24 should also exhibit good adhesion between the uncoated substrate 10 and the laser colorant 24 or with good adhesion between the colorant adhesive 24 and laser colorant, as described below.

One or more score and/or tear lines 26 are also preferably provided along the second surface 18, for example to aid in creating one or more fold lines between sections 16 and 18, as shown, which score line 26 would also be apparent along the colorant adhesive 24, if so coated. In the illustrated embodiment, a score line 26 provided between and along with two tear lines 26 are provided along and at least partially through said substrate 10 and are arranged perpendicular to an edge of the rectangular shape of the substrate 10 along a middle of sectional rounded corners dividing the substrate 10, preferably, into equal sections equaling the number of cut lines plus one. Other weakening line techniques are also contemplated, such as using perforations or other line defining structures that may extend within the thickness of any one or more of the material layers, or may be provided externally. Moreover, a combination of score lines and other weakening lines are contemplated, such a differently for a fold line versus a tear line.

According to a preferred aspect of the present invention, at least one section 16, 18 of the substrate 10 is opaque. The opaque section or sections can be provided by the material itself being opaque or by virtue of an opaque coating that can be provided on a section 16, 18 or both, which coating itself can be a film material or a coating.

In order to provide information or indicia or other data to a card surface, as will be described in greater detail below, a laser printed colorant (not shown in FIGS. 1 and 2) is provided on a surface of either the first and second sections 16 and 18, and preferably is provided on at least two surfaces of the first and second substrate sections 16, 18.

Certain constructions in accordance with the present invention are described as follows including variations of construction and production techniques. These variations are illustrated within FIGS. 1-12, and are described as follows as distinct embodiments.

Print on Substrate with Single Fold Line and Tear Strip—The card construction shown in FIG. 1 is a 2 panel 16, 18, single fold/tear lines, die cut, opaque substrate 10 that is one side coated with a substrate adhesive 22. The substrate 10 is directly printed on the non-adhesive side 14 to create front and back graphics by being symmetrically folded on the adhesive side 12. After folding, the card is heat laminated and a tear strip portion 28 can be removed to complete the card. The tear strip 28 is created by a combination of each of the layers as a portion of the folded card including material between the fold line and spaced tear lines. Such results from the three illustrated weakened lines 26 as shown for example in FIG. 1. Once the tear strip 28 is removed, the card sizing is complete. This construction depends on the substrate characteristics (in particular as on the second surface 16) for print quality and to protect the colorant durability.

Print on Colorant Adhesive with Single Fold Line and Tear Strip—The card construction of FIG. 2 is a 2 panel, single fold/tear lines, die cut, opaque substrate 10 that is two side coated with a substrate adhesive 22 and colorant adhesive 24. The colorant adhesive can be printed with front and back graphics and the layers can then be symmetrically folded together on the substrate adhesive 22 side. After folding, the construction can be heat laminated and the tear strip can then be removed to complete the card. This construction depends on the colorant adhesive characteristics for print quality and to protect the colorant durability.

Figure 3:
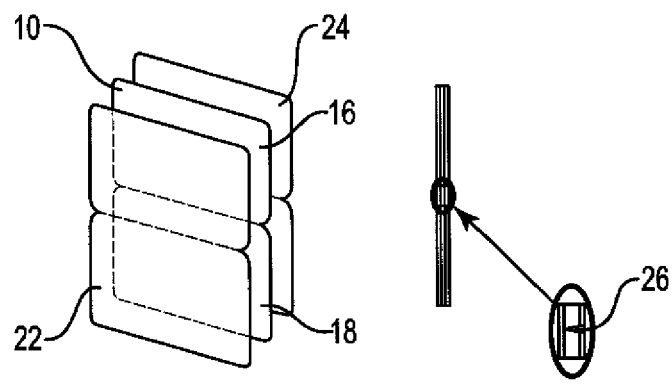
FIG. 3 shows print on colorant adhesive with single fold line.

Print on Colorant Adhesive with Single Fold Line—The card construction of FIG. 3 is a 2 panel 16, 18, single fold line 26, die cut, opaque substrate 10 that is two side coated with a substrate adhesive 22 and a colorant adhesive 24. The colorant adhesive 24 is printed with front and back graphics and the construction is symmetrically folded together on the substrate adhesive 22 side. The construction is then heat laminated to complete the card. This construction depends on the colorant adhesive characteristics for print quality and to protect the colorant durability. This embodiment is similar to that of FIG. 2 but without a tear strip.

Print on Opaque substrate with Single Fold Line

Figure 4:
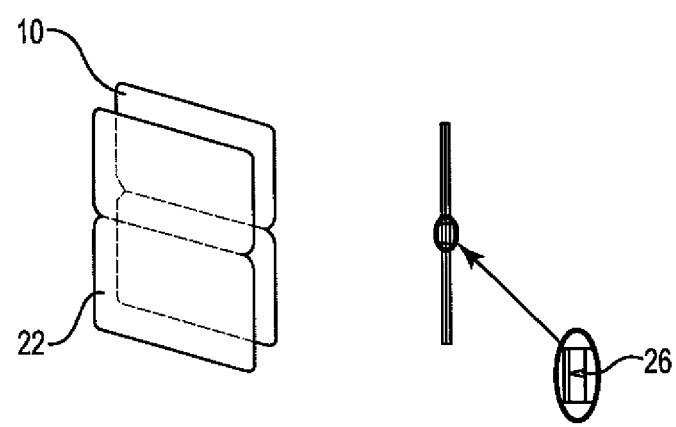
FIG. 4 shows print on opaque substrate with single fold line.

The card construction of FIG. 4 is a 2 panel 16, 18, single fold line 26, die cut, opaque substrate 10 that is one side coated with a substrate adhesive 22. The substrate is directly printed on the non-adhesive side of the substrate 10 with front and back graphics. The construction is then symmetrically folded together on the adhesive side 22, and heat laminated to complete the card. This construction depends on the substrate characteristics for print quality and to protect the colorant durability.

Figure 5:
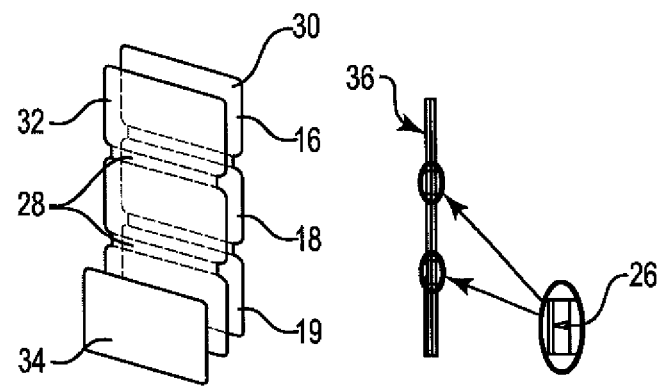
FIG. 5 shows print on substrate adhesive with double fold line and tear strip.

Print on Substrate Adhesive with Double Fold Line and Tear Strip—The card construction of FIG. 5 is a 3 panel 16, 18, 19, double fold/tear lines 28, die cut, transparent substrate 30 that is one side coated with a transparent colorant and substrate adhesive 32 on at least two out of the three panels 16, 18, 19. In the illustrated embodiment, the third panel 19 is coated or laminated with an opaque coating or film layer 34. The substrate can then be mirror image printed on the surface 36 of the transparent colorant and substrate adhesive 32 preferably on 2 panels so as to provide for front and back graphics to the card construction. This construct is first symmetrically folded by folding panel 18 onto panel 19 and thus over the opaque surface 34 as defined by the fold line 26 on the adhesive 32 side, and then, secondly, symmetrically folded on the second fold line 26 on the adhesive 32 side. The next step is to a heat/pressure lamination step followed by the steps of removing the two tear strips 28, in the same manner as described above for just one side, to complete the card. This construction depends on the colorant adhesive 32 characteristics for print quality and buried mirror image printing under a transparent polymer film 30 to protect the colorant durability.

Figure 6:
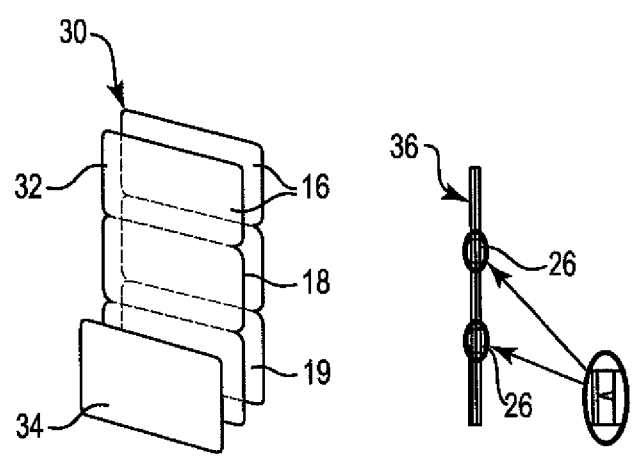
FIG. 6 shows print on substrate adhesive with double fold line.

Print on Substrate Adhesive with Double Fold Line—The card construction of FIG. 6 is a 3 panel 16, 18, 19, double fold/lines 26, die cut, transparent substrate 30 that is one side coated with a transparent colorant and substrate adhesive 32 preferably on two or three panels 16, 18, 19. The third panel 19 is preferably coated or laminated with an opaque coating or film 34. The substrate can be mirror image printed on the transparent colorant and substrate adhesive 32 on two panels for creating front and back graphics. The construct is first symmetrically folded over the opaque surface fold line on the adhesive side, and then, secondly, symmetrically folded on the second fold line on the adhesive side. The nest step is a heat/pressure lamination step to complete the card. This construction depends on the colorant adhesive 32 characteristics for print quality and buried mirror image printing under a transparent polymer film to protect the colorant durability. This construction is similar to that of FIG. 5, but without a tear strip.

Figure 7:
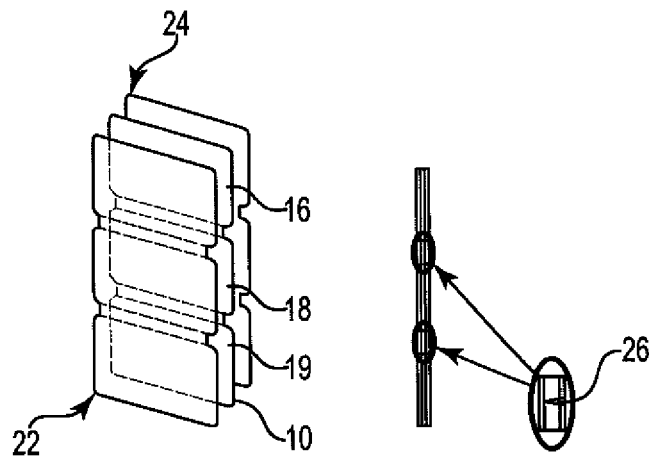
FIG. 7 shows print on colorant adhesive with double fold line and tear strip.
Figure 7A:
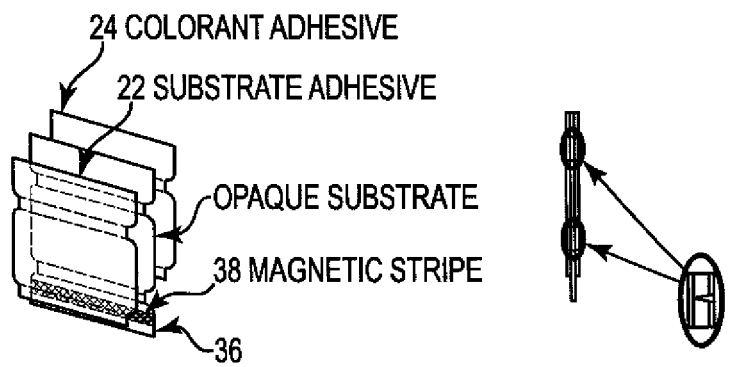
FIG. 7A shows print on colorant adhesive with double fold line and tear strip as can be applicable to any other print/adhesive combination or fold line method requiring a magnetic stripe.

Print on Colorant Adhesive with Double Fold Line and Tear Strip—The card construction of FIG. 7 is a 3 panel 16, 18, 19, double fold/tear lines 26, die cut, opaque substrate 10 that is two side coated with a colorant adhesive 24 on one side and a substrate adhesive 22 on 3 panels. The substrate is printed on the colorant adhesive 24 on at least adjacent panels to create front and back graphics. This construct is first preferably symmetrically folded over the non-printed surface fold line on the substrate adhesive side, and then, secondly, symmetrically folded on the second fold line on the substrate adhesive side. A next step is a heat/pressure lamination step and then the two tear strips can be removed to complete the card. This construction depends on the colorant adhesive characteristics for print quality and to protect the colorant durability.

Figure 8:
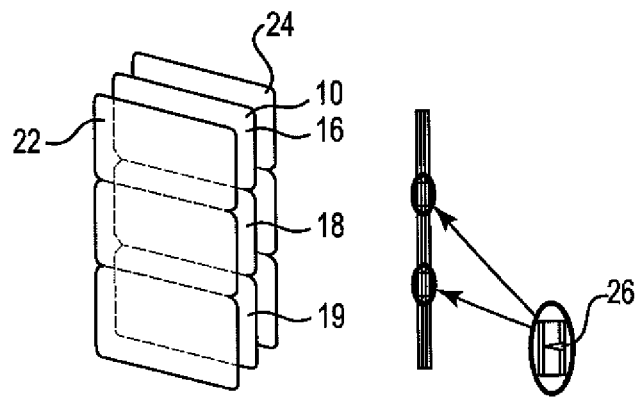
FIG. 8 shows print on colorant adhesive with double fold line.

Print on Colorant adhesive with Double Fold Line—The card construction of FIG. 8 is a 3 panel 16, 18, 19, double fold lines 26, die cut, opaque substrate 10 that is two side coated with a colorant adhesive 24 and a substrate adhesive 22 on all three panels. The substrate is printed on the colorant adhesive 24 on at least two adjacent panels to create front and back graphics. This construct is first preferably symmetrically folded over the non-printed surface fold line on the substrate adhesive side, and then, secondly, symmetrically folded on the second fold line on the substrate adhesive side. A next step is a heat lamination step to complete the card. This construction depends on the colorant adhesive characteristics for print quality and to protect the colorant durability.

Figure 9:
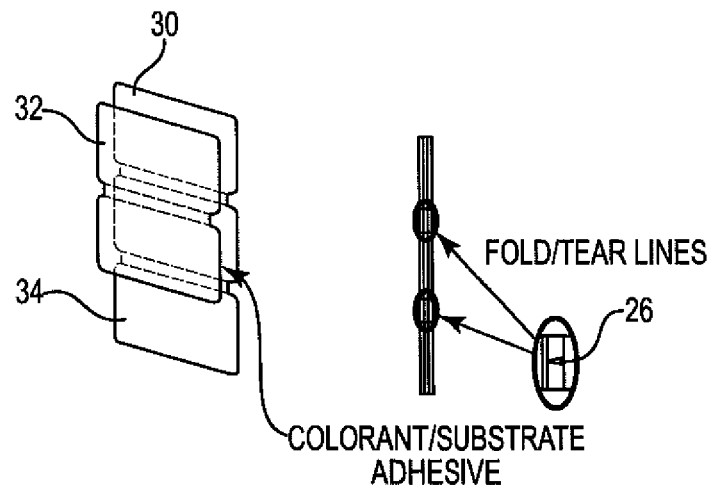
FIG. 9 shows print on colorant adhesive or opaque substrate with double fold line and tear strip.

Print on Colorant Adhesive or Opaque Substrate with Double Fold Line and Tear Strip—The card construction of FIG. 9 is a 3 panel 16, 18, 19, double fold/tear lines 26, die cut, two-panel transparent substrate 30 attached to a single panel opaque substrate 34. The two panel transparent substrate 30 is single side coated with a colorant and substrate adhesive 32. The transparent substrate 30 can be mirror image printed on the colorant adhesive 32 on at least two panels so as to create front and back graphics. The construct is first symmetrically folded over the opaque substrate panel fold line on the substrate adhesive side, and then, secondly, symmetrically folded on the second fold line on the substrate adhesive side. A next step is a heat lamination step and then the two tear strips can be removed to complete the card. This construction depends on the colorant adhesive characteristics for print quality and buried mirror image printing under the transparent substrate to protect the colorant durability.

Print on Colorant Adhesive with Double Fold Line or any Other Print/Adhesive Combination or Fold Line Method Requiring an Attached Magnetic Stripe—The card construction of FIG. 7 is similar to those above, but also including the addition of a magnetic stripe 38. The illustrated embodiment is a three panel 16, 18, 19, double fold/tear lines 26, die cut, 2 panel opaque substrate 34 attached to a single panel opaque or transparent substrate 36. A center opaque substrate panel is die cut full size while the other two side panels are die cut to total, together, one full size panel. The partial and full sized opaque substrate panels are double side coated with a colorant adhesive 24 and substrate adhesive 22. The opaque substrate 20 is printed on the colorant adhesive 24 on the two panels to create full sized front and partial sized back graphics. The construct is folded on the substrate adhesive side on the two fold lines. A next step is a heat/pressure lamination step and the two tear strips are then removed to complete the card. This construction depends on the colorant adhesive characteristics for print quality and to protect the colorant durability. An additional feature is the magnetic stripe 38 combined with the opaque or transparent substrate 36, which can be a rigid material, the same thickness as the two panel opaque substrate 20, which provides additional rigidity to improve reading of the magnetic stripe 38. The line that separates the two partial panels, when laminated, can be die cut as an arc, scallop or other similar shape to help prevent unwanted bending at that joint.

Note that within the above card constructions in those cases where three panels are being used with at least two transparent substrates, mirror image printing is preferably provided on the two transparent substrates colorant and substrate adhesive. Within the scope of this invention, the printing could be on one transparent substrate and the opaque substrate, coating or film.

Figure 10:
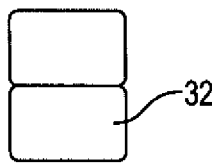
FIG. 10 shows an adhesive layer of certain constructions.
Figure 11:
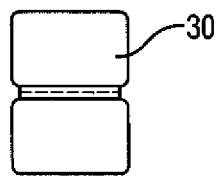
FIG. 11 shows a transparent substrate of certain constructions.

FIG. 10 shows colorant and substrate adhesive sections that, as examples, are provided in the list of potential colorant and substrate adhesives above. A single material compound may serve as both the colorant and substrate adhesive such as the specialty heat-activated, resin dispersion XLT001 from IYATECH of Ohio, USA, while others may be specially compounded for a specific need. For mirror image printing the adhesive should preferably be clear, while for direct printing the color will normally be clear or white FIG. 11 shows transparent substrate sections that, as examples, can be polyester or HDPE, each of which has good abrasion and chemical resistance. There are many clear polymers that would also work well in applications according to the present invention. Most constructions require a colorant adhesive coating if printing directly on the transparent substrate is required.

Figure 12:
FIG. 12 shows an opaque substrate of certain constructions.

FIG. 12 shows an exemplary opaque substrate, such as can be made of a film of material sold under the tradename Teslin, which material has good adhesion to most colorant and substrate adhesives, allows direct surface printing for most digital printers, has good durability, and has good heat transfer properties for printing in a laser printer. Many other single polymer or layered polymer constructions will also work effectively.

Figure 13:
FIG. 13 shows a lamination with a clear film protective label.

Lamination methods are described as follows based upon the materials as they are incorporated in card constructs with reference to FIGS. 13-16. In FIG. 13, a clear film protective label is illustrate that is similar to the transparent substrate described above, and is preferably die cut, normally to the card size, on a carrier liner. The label/s can be laminated to one or more surfaces on the card to protect the card graphics from tampering and increase card durability. The label may have a substrate adhesive, a pressure sensitive adhesive layer (PSA layer) or no adhesive if the mating surface has adhesive. The label is preferably synchronized with the card to align the leading edge and then pressure and or heat can be used to laminate the two surfaces.

Figure 14:
FIG. 14 shows a lamination with a clear film with security protective label.

In FIG. 14, a film with security protective label is illustrated of similar construction as the clear film protective label but with added security features. These security features can include the use of holographic imaging and other optical means, printed security features utilizing visible inks and inks that only appear using specific, non-visible, illumination wave lengths, physical features such a embossed patterns in the film, microscopic particles with identifying characteristics in the film, water marks, color shifting inks, micro printing and the like. These features help prevent forgery and tampering of the card.

Figure 15:
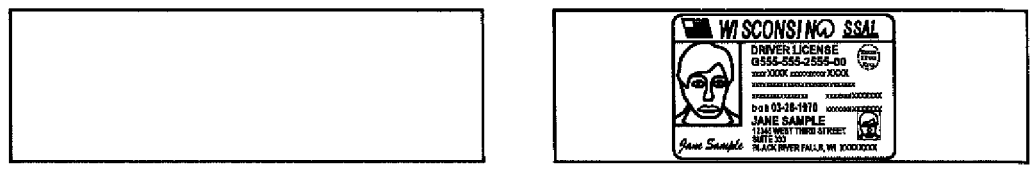
FIG. 15 shows a lamination with a clear hot stamp or mass thermal transfer resin overlay.

In FIG. 15, thermal resin overlays are illustrated that are similar to the substrate and colorant adhesives in that they have similar chemical compositions and they utilize heat as a transfer mechanism. A resin can be coated or cast on a release liner and wound up into a roll. coating thickness varies, for example, from a 0.00025 to 0.004 inches. The resin is transferred to the card surface using small heated elements, such as in a mass thermal transfer print head, a heated, fixed shape object such as used on hot stamp thermal transfer machines or a heated roller. In each case the resin can be applied only to the surface that has heat and pressure while the remainder stays with the release liner. An advantage is that the resin overlay does not need to be die cut but, in general, is less durable than labels.

Figure 16:
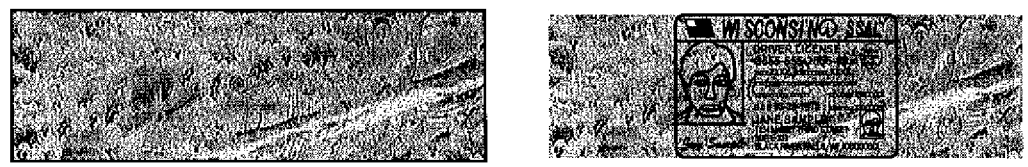
FIG. 16 shows a lamination with a clear hot stamp or mass thermal transfer resin overlay with security.
Figure 17:
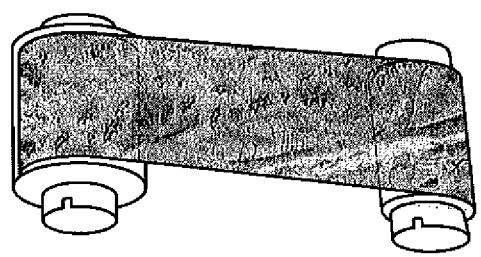
FIG. 17 shows a security hologram resin overlay or protective label roll.
Figure 18:
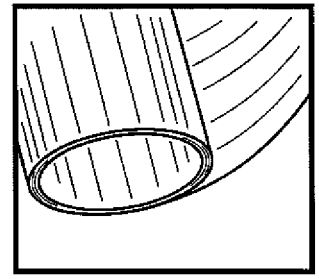
FIG. 18 shows a resin overlay or protective label roll.

In FIG. 16, a resin overlay with security is illustrated much again in a similar manner as the resin overlay construction, and with added security features. The features can include the use of holographic imaging and other optical means, printed security features utilizing visible inks and inks that only appear using specific, non-visible, illumination wave lengths, microscopic particles with identifying characteristics in the film, water marks, color shifting inks, and the like. These features help prevent forgery and tampering of the card. In FIG. 17, a roll of security hologram resin overlay or protective label coating or film is illustrated as such can be incorporated into the card constructs as are discussed above. Likewise, in FIG. 18, a roll of resin overlay or protective label coating or film is shown again as can be incorporated into the cards constructs of the present invention discussed above.

In accordance with another aspect of the present invention, certain card printing and folding operations are described as follows.

Figure 19:
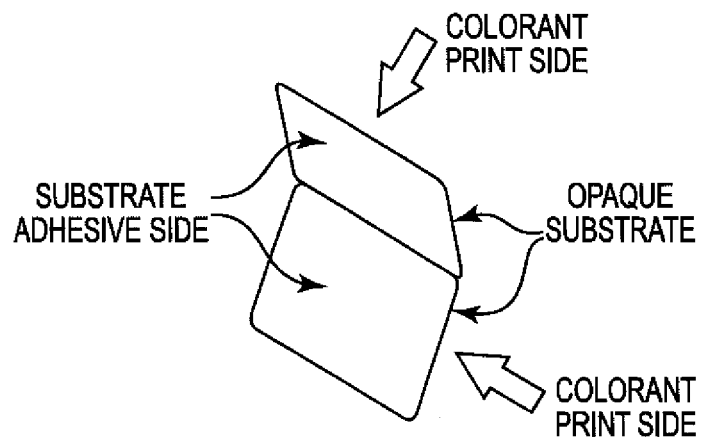
FIG. 19 shows a single fold opaque substrate.

In FIG. 19, a single fold line, opaque substrate construction is illustrated where the fold is on the non-printed side that has a coating of substrate adhesive. The construction is laminated after folding. The printed side may have a colorant adhesive to enhance print quality and durability. While shown without a tear strip, a tear strip would employ the same basic methods but with removal of tear strip after lamination.

Figure 20:
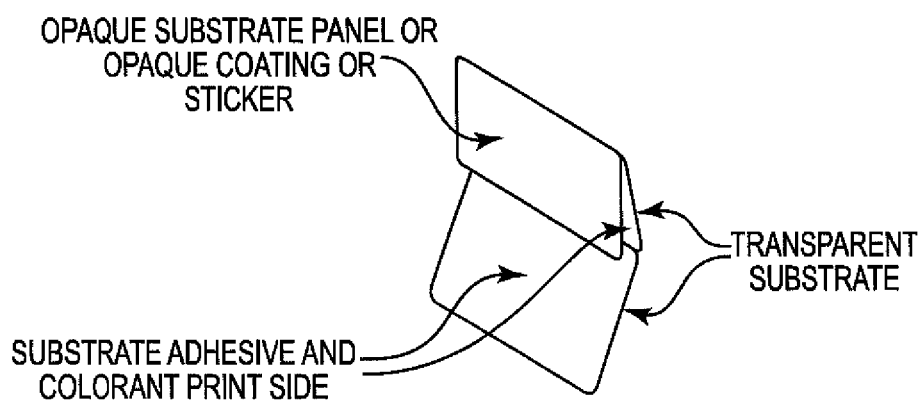
FIG. 20 shows a double fold transparent substrate.

In FIG. 20, a double fold line construction with two transparent substrate panels and an opaque panel or opaque coating or sticker is illustrated. The two transparent panels are printed in mirror image on the colorant and substrate adhesive coated side which is twice folded allowing the graphics to be protected by the transparent substrate. The construction is laminated after folding. While shown without a tear strip, a tear strip would employ the same basic methods but with removal of tear strip after lamination.

Figure 21:
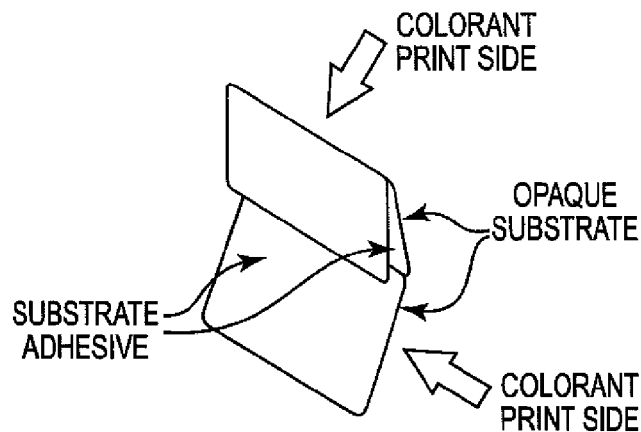
FIG. 21 shows a double fold opaque substrate.

In FIG. 21, a double fold line construction with three opaque substrate panels is illustrated. Two adjacent opaque panels are directly printed on the outside surface. The printed side may have a colorant adhesive to enhance print quality and durability. The substrate adhesive is coated inside, which is twice folded and laminated. While shown without a tear strip, a tear strip would employ the same basic methods but with removal of tear strip after lamination.

Figure 22:
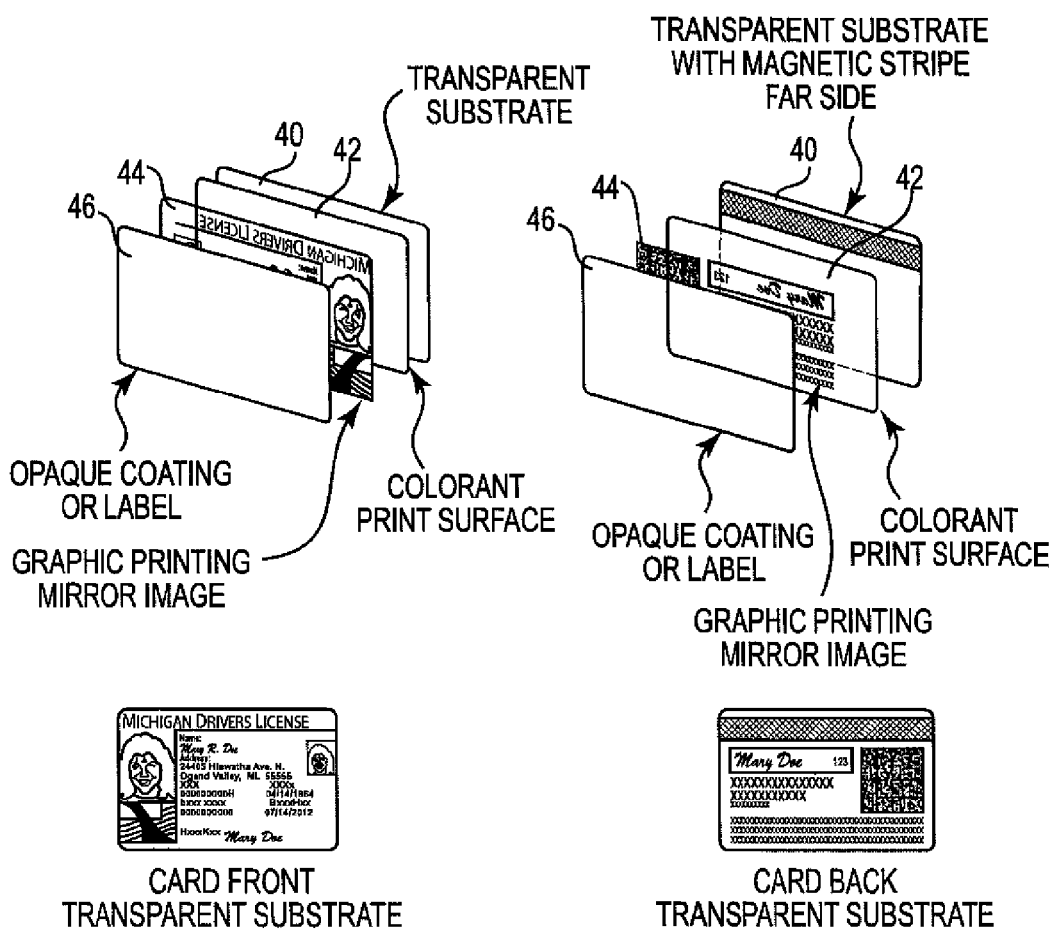
FIG. 22 shows a card colorant printing with a transparent substrate.

In FIG. 22, a layered construction of a transparent substrate card is illustrated. layer 40 is a transparent substrate, layer 42 is a colorant and substrate adhesive, layer 44 is a printed colorant, and layer 46 is an opaque panel, coating or label. The finished card, front and back, is also shown. Note that both the transparent and the opaque constructions as each are illustrated side by side appear the same as finished products.

Figure 23:
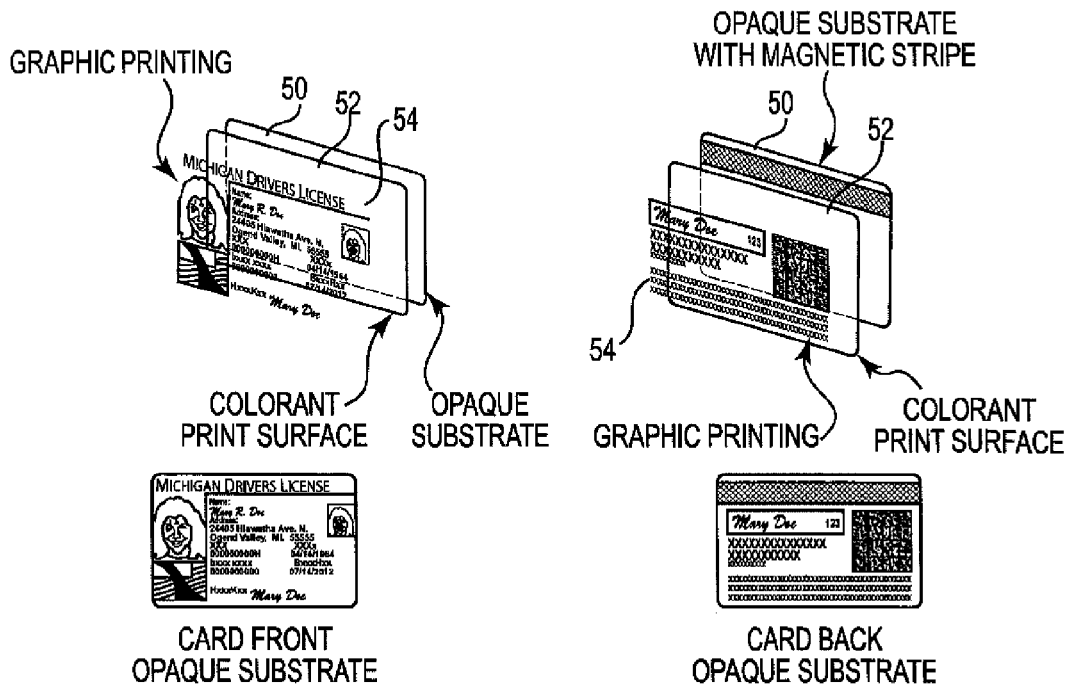
FIG. 23 shows a card colorant printing with an opaque substrate.

In FIG. 23, a layered construction of the opaque substrate card is illustrated. Layer 50 is an opaque substrate, layer 52 is a colorant and substrate adhesive, and layer 54, the outer layer, is a printed colorant. The finished card, front and back, is also shown. Note that both the transparent and the opaque constructions as each are illustrated side by side appear the same as finished products.

Figure 24:
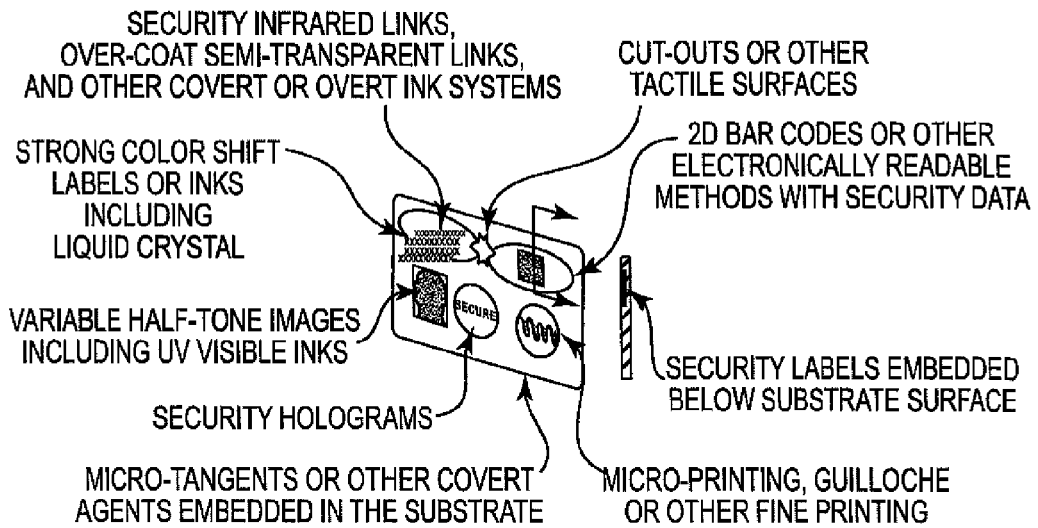
FIG. 24 shows a card security features, and illustrates methods and devices of the present invention.

The following discussion relates to another aspect of the present invention including the addition of certain security features with card constructions along with the ability to electronically read data from such cards and graphics as may be included within such card designs. Many such features are illustrated within the card of FIG. 24.

Methods of providing card security are many and can be decided by the jurisdiction specifying a particular card. The reasons for card security can also widely vary among card issuing authorities based upon many factors that may or may not be important. Card security can be used to prevent forgery, duplication and tampering of a legitimate card. Thus, security features should not be available to anyone other than the authorized manufacture of the card.

Preferably, security features should be recognizable and verifiable by an officer of the jurisdiction issuing the cards. The features can be overt, visible on the card or covert, hidden within the card. A card holder should also preferably be authenticated and verifiable by an identification card without fear of a fraudulent identification based on forgery, duplication and tampering of a legitimate card. Law enforcement, based on card identification, can demonstrate, for example, that a card holder has paid taxes and fees, obeyed restrictions and permit conditions or any other conditions set forth by the jurisdiction. While security features that are available are numerous, some may find greater use than others based upon the needs of applications.

Security features include the following factors, as may be incorporated into card designs of the present invention.

Surface Treatments can be incorporated into card designs. A card can have elaborate cutouts or other tactile treatments that provide a feature that can both be recognized by touch and site. A tactile treatment may be provided in a pattern that shows jurisdictional recognition, random, or a Guilloche like pattern. This security method is hard to accurately duplicate and helps prevent card forgery, duplication and tampering.

Security inks may also be incorporated into card design. Security inks are easy to deploy but hard to duplicate or change. Some inks only appear at certain illumination wave lengths and can be verified by using an illumination source with the correct wave length. Strong color shift inks change colors as the card is rotated around its horizontal or vertical axis. Semitransparent inks can be printed in half tone graphics over large areas of the card to prevent changes to graphics such as the facial image or text such as the date of birth. Half tone graphics can be printed with non-visible patterns, such as using ultraviolet inks that only appear under ultraviolet illumination Printing techniques, such as micro or Guilloche printing techniques can also be incorporated within card design features. Certain printing methods, such as Micro and Guilloche printing (both being conventionally know printing methods) cannot be successfully copied on a copier nor are they easy to duplicate. These printing schemes will provide security with little additional cost or effort Micro sized particles or micro-tagents that have specific identification features, such as rings of colors, can be mixed with substrate polymers to identify a particular jurisdiction. These cards can also be printed patterns between substrate layers, other chemicals or any method that provides a feature not in common use. This method is covert and usually requires a laboratory to correctly identify legitimate cards.

Likewise, electronically readable media can be incorporated within card design adding two important features in that it provides security while also providing a means of electronically transferring data. Security is the ability to electronically duplicate all of the card data including biometrics such as fingerprints and the facial image to verify the card. When the electronically read data is encrypted and otherwise secured it cannot be forged or used by anyone other than the card holder. Forgery, duplication and tampering are meaningless if there is no way to beat biometric identification.

Also, it is contemplated to incorporate certain labels that can be made from highly secured materials such as liquid crystal and retroreflective materials. These labels are some of the strongest deterrents to forgery, duplication and tampering of Identification cards. For extra security the labels can be made very thin or placed in a surface pocket where both the bottom side and top of the sticker are adhered to the card opaque and transparent substrates making intact removal almost impossible.

While all of the above security features do help prevent forgery, duplication and tampering, one preferred solution is an electronically readable means such as two-dimensional code available from InfoTechCN LLC of Ramsey, Minn., with a tradename of ITCode™. This code is electronically readable using low cost hardware, holds up to 1800 bytes of data in just over one square inch, has all of the card holder demographic data, two fingerprint minutia, the facial image, jurisdictional data, application data such as medical or financial information and can be triple encoded for the entire block of data as well as individual sections to provide privacy. The code does not add production or material costs to the identification card. Other than a few security printing methods that prevent low level attempts at forgery or tampering, the ITCode™ is a security method that can by itself provide for highly secure identification.

Figure 25:
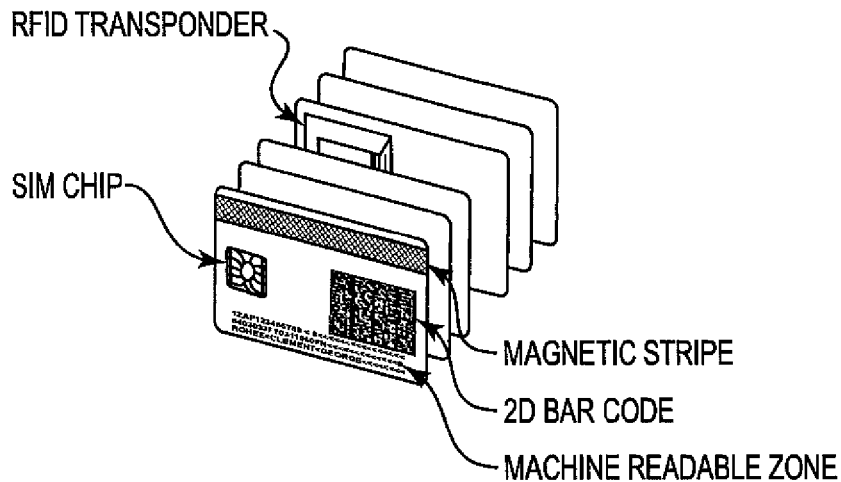
FIG. 25 shows a card electronically readable data device and illustrates methods of the present invention.

The following discussion relates to another aspect of the present invention including the addition of certain electronically readable data device and methods into card constructions Many such features are illustrated within the card of FIG. 25.

There are a number of methods that are commonly used to place Electronically Readable Data on a card including the following.

A contactless Passive RFID Transponder is a device that has an antenna and an integrated circuit (IC) that forms a method of storing data and electronically extracting that data using RF energy. The antenna and an integrated circuit are normally very thin and about 1 square inch in size. The device can be sandwiched between two substrate layers of the card. A remote RF reader, generating a RF signal, sends RF energy through the device antenna, which both provides energy to activate the IC and transmit the stored data to the reader. The IC can also receive and store data as well as process the data if the IC is equipped with a CPU. A major advantage is that the reading can be done without physical contact from a few inches away up to 6 meters. The disadvantage is high cost for the device at, often, a not an acceptable cost and durability that may be ½ the card life.

A contact SIM chip card device is an integrated circuit that is encased in a polymer card with the contact area of the chip exposed. A CPU and memory device can be read and written to by making electronic contact with the chip contact pads. While having good initial success, the longevity turned out to be short of what is required for long term ID cards and so this card is mostly used for prepaid phone cards and public transportation cards based on being lower cost than contactless cards A magnetic stripe is the most commonly used electronically readable means and is used on most every financial card. It does not have the durability, storage capacity or secured data for use on long term ID cards. It can be used as a low cost source for small, unsecured data content or where the cost of data loss or forgery is covered by vast financial resources such as with financial cards A two-dimensional barcode is an effective means of putting electronically readable data on a card. It is low cost or in some cases almost without cost, it can be highly secured, hold large amounts of data, as durable as the card itself, and easy to read as described above.

Optical character electronic readers are getting more accurate and more commonly used. Today most all passports have optical character machine readable zones. The future will have both two-dimensional codes and optical character machine readable zones since typically one reader can read both. Optically readable characters can be read visually, are low cost or in some cases almost without cost, and are as durable as the card itself.

Figure 26:
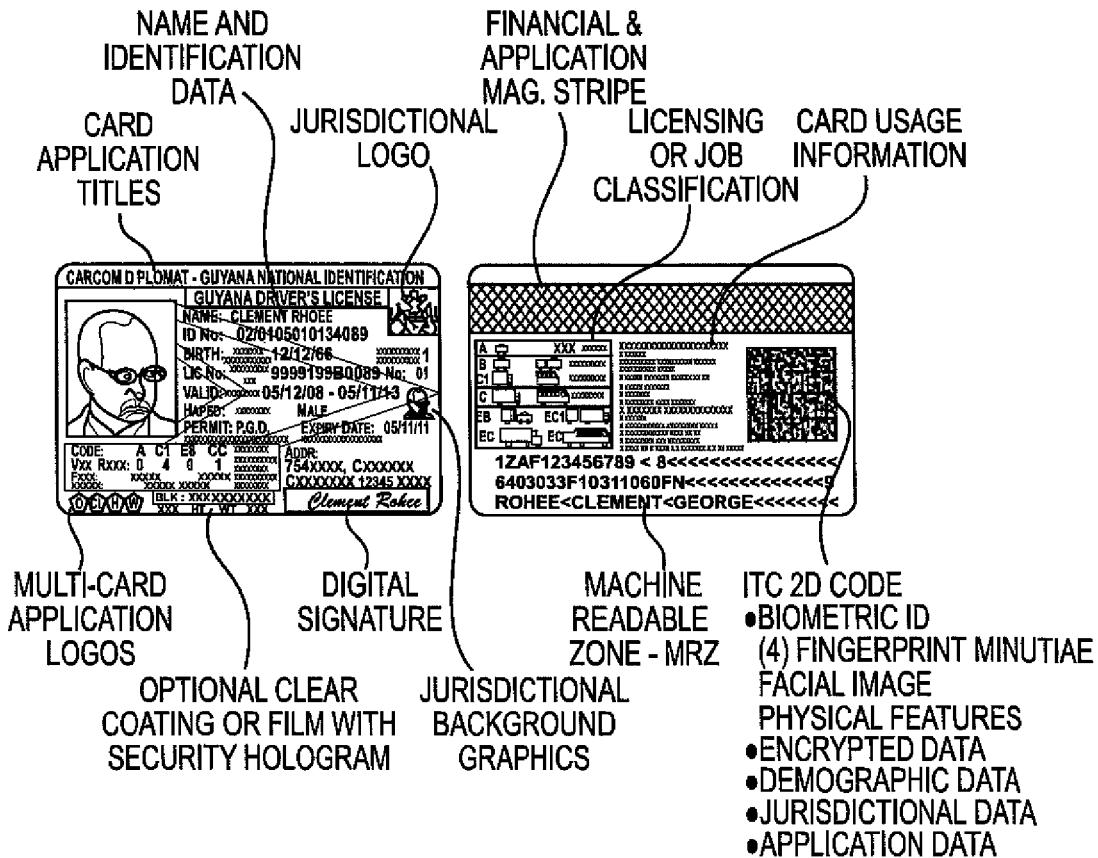
FIG. 26 shows a multi-purpose banking and bio-ID card with secure applications.

Based upon combinations of the features discussed above, multi-purpose cards can be created. Such multi-purposes can include banking, health care, Bio-ID and other secure applications all in a durable, highly secure, low cost format. The card illustrated in FIG. 26 is an example of such a multi-purpose card, that while very busy, has many of the features detailed above. A multi-purpose card can be made using any of the shown card constructions, any of the card printing and folding means, have any of the card security, electronically readable methods or graphic features, all in a durable, highly secure, low cost format.

The illustrated card has a complete set of printed demographic information, jurisdiction identification and data, and card holder biometric information including the facial image, electronic signature and physical features. Multiple card logos (bugs) may also be provided for additional applications such as financial transactions (EBT), driver's license, health care, voter, social programs and the like. The illustrated card also includes data for permits and licensing and the conditions and restrictions for each, along with multiple forms of electronically readable data including magnetic stripe, OCR data zone and an ITC 2D code.

Data may be provided in an electronically readable format including fingerprint minutia, facial image, physical features, demographic data, jurisdictional data, application data for financial transactions, driver's license, health care, voter, and social programs as examples. Multiple security features can be included for both covert and overt security.

Additional graphics to easily identify the jurisdiction, licensing, job or permit conditions, card usage details, and country of origin also can be included.

An exemplary opaque substrate 10 is 0.014 inch thick film, such as that sold under the tradename Teslin, an exemplary transparent substrate is 0.006 inch thick Polyester film and the exemplary colorant and substrate adhesive is XLT001 from IYATECH of Ohio, USA. The common thickness for a completed card is 0.030 inches. Each of the component substrates and adhesives and coatings or films, when heat laminated together must equal the completed card thickness. An exemplary panel or section of a substrate is, by common practice, 3.375 inches wide by 2.125 inches high and will have rounded corners. Up to 3 panels or sections can be die cut or joined together to form a complete card construction, printed, and folded into the shape of a single panel approximately 3.375 inches by 2.125 inches before lamination. opaque substrate panels and transparent substrate panel/s may be combined in a single card construction. Other security features, electronically readable data means, pre-printed graphics and other such enhancement features can be added to the basic card constructions.

Figure 33:
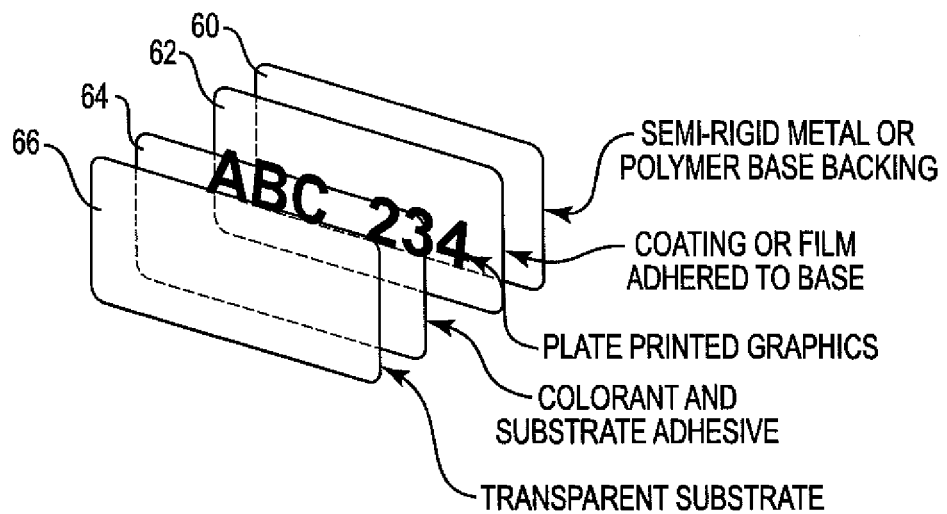
FIG. 33 shows a multi-layer license plate construction.
Figure 34:
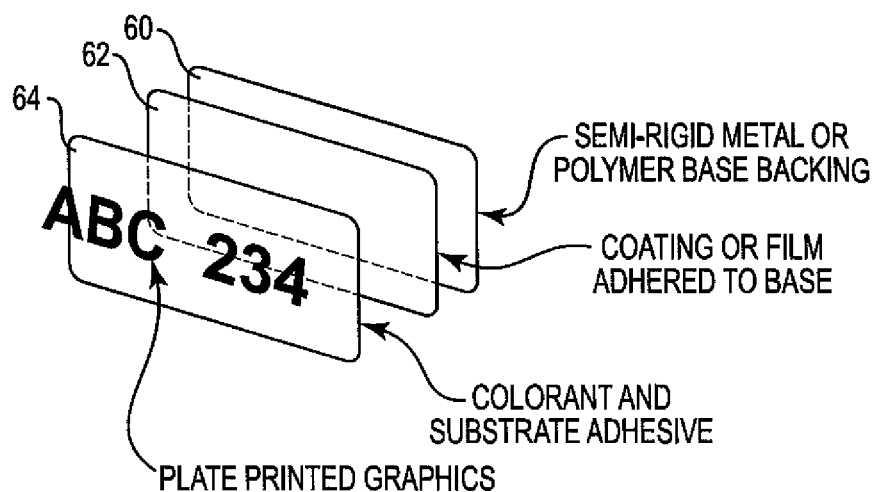
FIG. 34 shows an alternative multi-layer license plate construction.

License plate constructions of the present invention are illustrated within FIGS. 33 and 34 and can comprise a metal or polymer base backing plate 60, a coating or film 62 adhered to the base plate 60 and colorant and substrate adhesive 64 on either the coating or film 62 or a transparent substrate 66. These different constructions allows for plural methods of plate production including a Mirror image printing on a transparent substrate with a colorant and substrate adhesive that is laminated to the coating or film on the base plate (Buried Graphics LP) or direct printing on coating or film with a colorant adhesive (Exposed Graphics LP).

For license plate production, a base material is initially provided onto which graphics, information, or other data is to be provided by any number of other layers as described below. For the base material, metals and plastics (polymeric materials) are preferably contemplated.

A polymer base material is lighter than aluminum, costs less than aluminum and rebounds to a flat plate if bent over. High-density polyethylene (HDPE) is an example of a polymer with good attributes as a LP base material while having a relatively low cost.

Aluminum base material that will meet the jurisdictional requirements is normally from 0.024 to 0.027 inches thick and made from various alloys and hardness and conversion coating for weather resistance. Other thickness can also be used.

Common films that can be used for license plates are embossable, high grade, retroreflective sheeting materials that have optical properties and durability that will meet jurisdictional requirements. An example is 3M Series 4770 pre-cleared license plate sheeting Background graphics are colored, printed background images that have the optical properties and durability that will meet the jurisdictional requirements.

Registration characters are printed registration characters, both consecutive or jurisdictional required sequences, that have the optical properties and durability that will meet the jurisdictional requirements.

Special graphics are printed images that provide security features or convey jurisdiction information such as the vehicle class, driver permits, registration and tax and the like, that have the optical properties and durability that will meet the jurisdictional requirements.

Secured 2D ITC Barcode is a secured barcode that is printed on the plate, which has jurisdictional and sequential numbers and other vehicle and owner data, with the optical properties and durability that will meet the jurisdictional requirements.

A transparent top film or transparent substrate preferably is provided with a colorant and adhesive coating and can be printed using a laser or other digital printer, and then laminated to the retroreflective sheeting burying all graphics. Also, the transparent top film or substrate can be embossed, ink roll coated or hot stamped, and is further preferably provided with optical properties and durability that will meet the jurisdictional requirements.

Security Features can also be incorporated within any such license plate construction much in the same manner as with driver's licenses discussed above.

Optical security Marks—These high security methods use retroreflective sheeting that has been modified using a laser that removes a small spot of the aluminum reflector coat behind the glass beads to form custom security marking that is specific to the jurisdiction. As the plate is rotated the markings appear and disappear.

Security Inks—Security inks are easy to deploy but hard to duplicate or change. Some inks only appear at certain illumination wave lengths and can be verified by using an illumination source with the correct wave length. Strong color shift inks change colors as the LP is viewed around its horizontal or vertical axis. Half tone graphics can be printed with non-visible patterns, such as using ultraviolet inks, that only appear under ultraviolet illumination Micro or Guilloche printing—Certain printing methods, such as Micro and Guilloche printing cannot be successfully copied on a copier nor are they easy to duplicate. These printing schemes will provide security with little additional cost or effort Micro-Tagents and Other covert Security Agents—Micro sized particles that have specific identification features, such as rings of colors, are mixed with the substrate polymer to identify a particular jurisdiction. There can also be printed patterns between substrate layers, other chemicals or any method that provides a feature not in common use. This method is covert and usually requires a laboratory to correctly identify legitimate LPs.

Electronically Readable Media—Electronically readable media has two important features in that it provides security while also providing a means of electronically transferring data. When the electronically read data is encrypted and otherwise secured it cannot be forged or used by anyone other than the LP holder. Forgery, duplication and tampering are meaningless if there is no way to beat this identification method.

Security labels—labels can be made from highly secured materials such as hologram, liquid crystal and retroreflective materials. These labels are some of the strongest deterrents to forgery, duplication and tampering of license plates. For extra security the labels can be made very thin where both the bottom side and top of the sticker are adhered to the reflective sheeting and transparent top film making intact removal almost impossible.

While all of the above security features do help prevent forgery, duplication and tampering, a preferred solution is an electronically readable means such as the InfoTechCN LLC of Ramsey, Minn., USA, 2D code called the ITCode™. This code is electronically readable using low cost hardware, holds up to 1800 bytes of data in just over one square inch, has jurisdictional data and plate identification data which can be triple encrypted for the entire block of data as well as individual sections to provide privacy. The code does not add production or material costs to the LP. Other than a few security printing methods that prevent low level attempts at forgery or tampering, the ITCode™ is the only security method required for highly secure identification.

Figure 27:
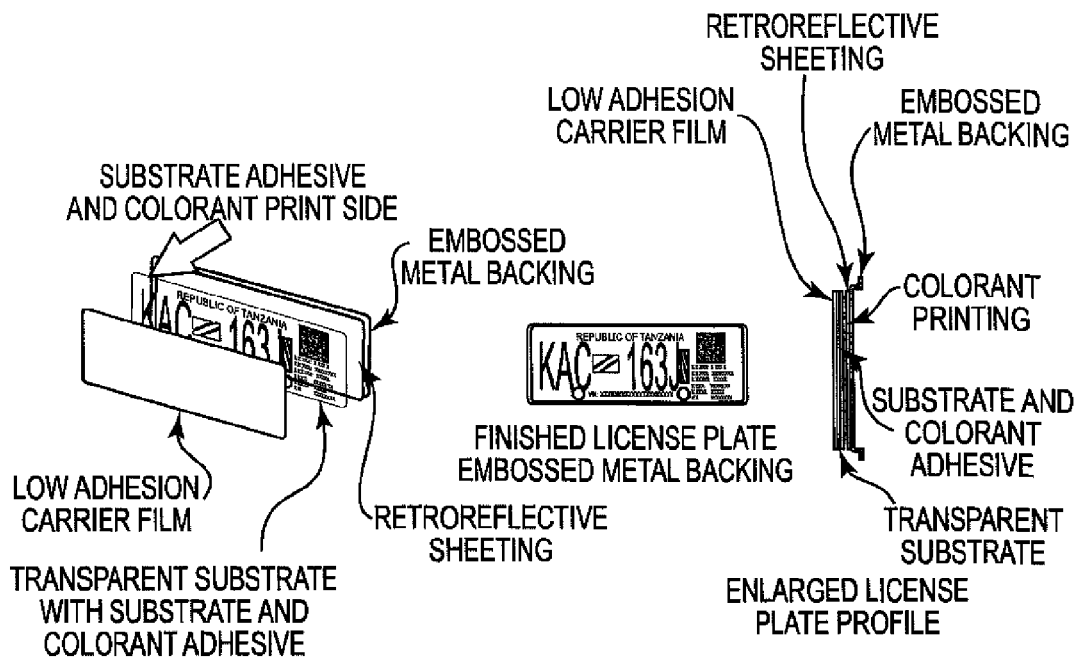
FIG. 27 shows a license plate with embossed metal backing.

With reference to FIG. 27, aspects of manufacturing or production methods of the present invention are described as follows based upon the use of a metal backing material.

A base plate can be made from an embossable metal that preferably has a top film of retroreflective sheeting laminated to metal. The retroreflective sheeting can be coated with a substrate adhesive or a colorant and substrate adhesive. While other metal finishing methods, such as polymeric films and polymeric coatings can be employed, most current plates use the retroreflective sheeting for night safety and readability. The Base is preferably die cut to size, for example, for the United States the plate size is 6 inches by 12 inches, the corners are rounded, the bolt slots are die cut and in some case the outside rim is debossed to provide plate rigidity.

A transparent substrate can be made from PVC or HDPE or any other polymer that is optically clear, durable and receptive to the colorant and substrate adhesive. The film is preferably coated with the colorant and substrate adhesive. This film is also preferably die cut on a Low Adhesion Carrier film to the full license plate size or the embossed top area of the license plate. The rounded corners and bolt slots can also be die cut. Some portion of the graphics noted below can be preprinted during a die cutting operation.

Graphics can be applied by printing the transparent substrate on the colorant and substrate adhesive side using a laser, ink jet printer or other digital printer. The printed graphics can include jurisdictional background graphics, vehicle registration characters, barcodes or other electronically readable means, jurisdictional logos for vehicle classification or limitations, registration expiration, tax payment or other jurisdiction requirements emblems, specific vehicle and owner data or any combination or additional graphics required. The colorants used should be environmentally durable and have good adhesion to the colorant adhesive. For some transparent substrates, where the polymer is receptive to the colorant, the printing is applied directly to the transparent substrate.

Lamination is a next step in producing a license plate. A transparent substrate can be heat and pressure laminated to the base plate with the retroreflective sheeting. Either or both the transparent substrate and the retroreflective sheeting can have a substrate adhesive that facilitates the adhesion process. The lamination process can be either done by a hand method where the base plate and the transparent substrate are manually aligned and fed into a heat/pressure laminator. Or, the process can also be automated where, attached to the printer, is a mechanical and electronic means of aligning the base plate and the transparent substrate and then feeding the combination into a heat/pressure laminator.

Registration Character Embossing is a further step for jurisdictions that require registration characters to be embossed. The printed registration characters can be monospaced such that each character uses the same space as all others. Character embossing dies can also have exactly the same space construction so that when the character dies are put into the die holder they will align with the printed characters. In general this is a hand operation most often done in prisons in the USA. For those jurisdictions that do not require embossed characters, the plate is finished after lamination. If the registration characters are not preprinted, then the registration characters can be embossed and ink roll coated or hot film stamped to place colorant on each embossed character.

Yet a further variation is a license plate construction that can be directly printed and that does not require lamination. Such a plate construction can include a base of aluminum or polymeric material with pre-cleared retroreflective sheeting where the clear top film is receptive to the colorant adhesive coated on the retroreflective sheeting. Plates with a film or coating over the metal base are also within the scope of this invention. The plate can be die cut to size with rounded corners and bolt slots. The printer can be a solvent ink jet that accepts the thick rigid plate or a laser printer that has been modified to accept the thick, rigid plate. In general this construction will not have the durability of a laminated construction.

One specific example for a license plate as can be specified, for example, by a jurisdiction can include an aluminum base plate (with or without outside edge debossing), retroreflective sheeting applied with the optical security marking, printed background graphics, a printed secure ITC 2D Barcode (jurisdictional data and sequential characters and printed text of the sequential characters) with security features alternatively added according to jurisdictional requirements. In such example, all printing can be buried under an adhered transparent top film or substrate. The license plate can require registration character embossing and either ink roll coating or hot stamp film to be applied over the embossed characters to finish the plate.

Another specific example for a license plate as can be specified can include an aluminum base plate (with or without outside edge debossing), retroreflective sheeting that can be applied along with the optical security marking, printed background graphics, printed registration characters, and preferably a printed secure ITC 2D Barcode (Jurisdictional data, the registration characters and sequential characters and printed text of the sequential characters), security features as can be added according to jurisdictional requirements. Preferably, all printing will be buried under an adhered transparent top film or substrate. A database of registration characters, sequential characters and jurisdictional data can also be furnished. Note that the plate is finished at this point and does not need embossing as a completion step. The license plate registration character can be embossed into the printed registration characters to finish the plate.

Another specific example for a license plate as can be specified is directed to a situation where a plate is required to be made for a specific owner and vehicle where the data is furnished to make the custom plate. Such a plate can include an aluminum base plate (with or without outside edge debossing), retroreflective sheeting as can be applied with the optical security marking, printed background graphics, printed registration characters as they can be placed on the plate and some portion of the vehicle owner data, vehicle specific data, vehicle certificate data to fully identify all owner and vehicle data, visually on the plate. Also, a printed secure ITC 2D Barcode (jurisdictional data, the registration characters, vehicle owner data, vehicle specific data, vehicle certificate data and sequential characters and printed text of the sequential characters) is preferably provided. Security features can also be added according to jurisdictional requirements. Preferably, all printing will be buried under an adhered transparent top film or substrate. A database of registration characters, sequential characters and jurisdictional data Vehicle owner data, vehicle specific data, vehicle certificate data would preferably also be furnished. Note that the plate is finished at this point and does not need embossing as a completion step. The LP registration character can be embossed into the printed registration characters to finish the plate.

Figure 28:
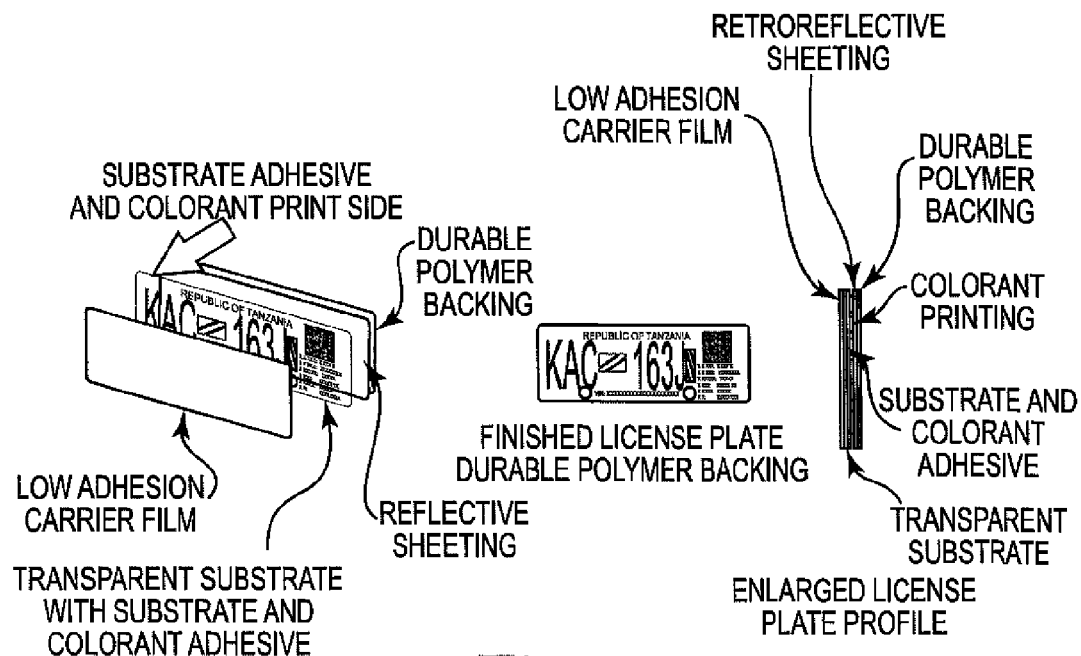
FIG. 28 shows a license plate with a durable polymer backing.
Figure 29:
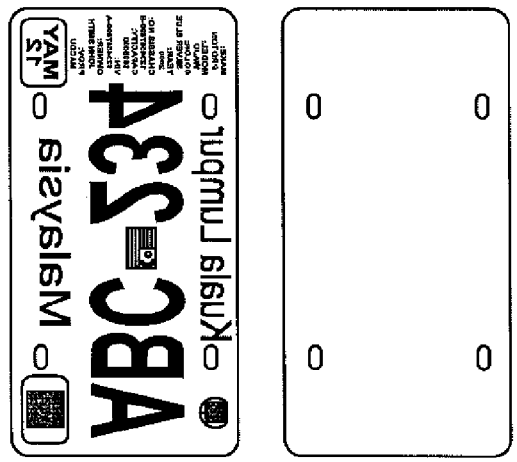
FIG. 29 shows a transparent top film and polymer backing components.
Figure 30:
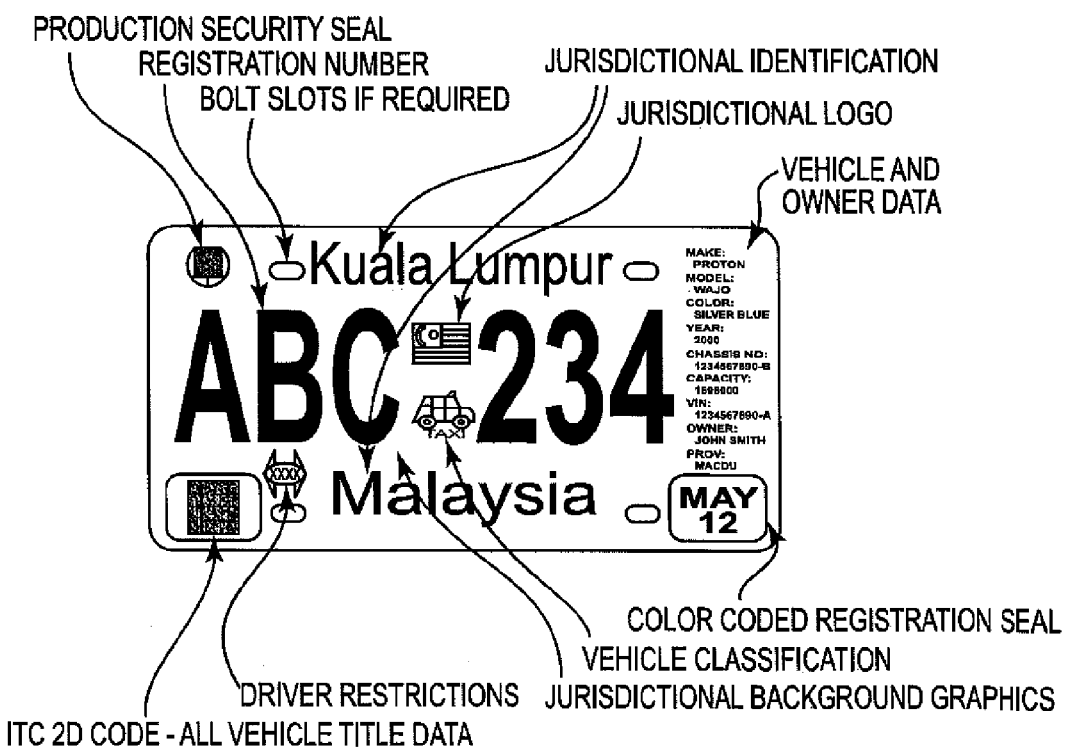
FIG. 30 shows license plate features.

With reference to FIG. 28, aspects of manufacturing or production methods of the present invention are described as follows based upon the use of durable polymeric backing material.

A base plate can be made from a durable polymer sheeting that normally has a top film of retroreflective sheeting laminated to polymer base plate. The retroreflective sheeting can be coated with a substrate adhesive or a colorant and substrate adhesive. While other finishing films or coatings can be employed, most current plates use the retroreflective sheeting for night safety and readability. The polymer and top film can be die cut to size, in the USA 6 inches by 12 inches, the corners can be rounded, and the bolt slots can be die cut.

A transparent substrate can also be made from PVC or HDPE or any other polymer that is optically clear, durable and receptive to the colorant and substrate adhesive. The film will normally be coated with the colorant and substrate adhesive. This film can be die cut on a low adhesion carrier film to the full license plate size. The rounded corners and bolt slots are preferably also die cut. Some portion of the graphics noted below can be preprinted during a die cutting operation.

Graphics can be applied by printing the transparent substrate on the colorant and substrate adhesive side using a laser, ink jet printer or other digital printer. The printed graphics can consist of jurisdictional background graphics, vehicle registration characters, barcodes or other electronically readable means, jurisdictional logos for vehicle classification or limitations, registration expiration, tax payment or other jurisdiction requirements emblems, specific vehicle and owner data or any combination or additional graphics required. The colorants used should be environmentally durable and have good adhesion to the colorant adhesive. For some transparent substrates, where the polymer is receptive to the colorant, the printing can be applied directly to the transparent substrate.

Lamination is a next step in producing such a license plate. The transparent substrate is heat and pressure laminated to the base plate with the retroreflective sheeting. Either or both the transparent substrate and the retroreflective sheeting can have a substrate adhesive that facilitates the adhesion process. The lamination process can be either done by a hand method where the base plate and the transparent substrate are manually aligned and fed into a heat/pressure laminator. The process can also be automated, where attached to the printer, is a mechanical and electronic means of aligning the base plate and the transparent substrate and then feeding the combination into a heat/pressure laminator.

A variation to such a license plate construction is one that can be directly printed and would therefore not require lamination. This plate construction can comprise a polymer with pre-cleared retroreflective sheeting where the clear top film is receptive to the colorant adhesive coated on the retroreflective sheeting. Plates with a film or coating over the polymer base are also within the scope of this invention. The plate may have been die cut to size with rounded corners and bolt slots. The printer can be a solvent ink jet that accepts the thick rigid plate or a laser printer that has been modified to accept the thick rigid plate. In general this construction will not have the durability of a laminated construction.

One specific example for a license plate as can be specified, for example, by a jurisdiction can include a polymer base plate with retroreflective sheeting applied with the optical security marking, printed background graphics, printed secure ITC 2D Barcode (Jurisdictional data and sequential characters and printed text of the sequential characters), and security features that can be added according to jurisdictional requirements. Preferably also, a die cut transparent substrate in included. This license plate may further require registration characters to be printed on the transparent substrate using ink jet, laser or any suitable digital printer means. Once the transparent substrate is printed, the jurisdiction can laminate the base plate to the transparent substrate using a heat/pressure laminator.

Another specific example for a license plate as can be specified, for example, by a jurisdiction can include a polymer base plate with retroreflective sheeting applied with the optical security marking, printed background graphics, printed registration characters as can be placed on the plate, a printed secure ITC 2D Barcode (Jurisdictional data, the registration characters and sequential characters and printed text of the sequential characters), and security features that can be added according to jurisdictional requirements. Preferably, all printing is buried under an adhered transparent top film or substrate. A database of registration characters, sequential characters and jurisdictional data can also be furnished. Note that the plate is finished at this point.

Another specific example for a license plate as can be specified is directed to a situation where a plate is required to be made for a specific owner and vehicle where the data is furnished to make the custom plate. Such a plate can include a polymer base plate with retroreflective sheeting applied with the optical security marking, printed background graphics, printed registration characters can be placed on the plate and some portion of the Vehicle owner data, vehicle specific data, vehicle certificate data to fully identify all owner and vehicle data, visually on the plate, a printed secure ITC 2D Barcode (Jurisdictional data, the registration characters, vehicle owner data, vehicle specific data, vehicle certificate data and sequential characters and printed text of the sequential characters), and security features can be added according to jurisdictional requirements. All printing is preferably buried under an adhered transparent top film or substrate. A database of registration characters, sequential characters and jurisdictional data vehicle owner data, vehicle specific data, vehicle certificate data can also be furnished. Note that the plate is finished at this point.

In comparing a metal backing plate to a durable polymer backing plate as shown in FIGS. 27 and 28, the only material difference between an embossed metal backing plate and durable polymer backing plate is the base material. The first base material can be metal such as aluminum and the second can be a polymer such as HDPE. The transparent substrate, colorant and substrate adhesives, retroreflective sheeting, graphics used on the plate, methods of printing the plate, lamination methods, both hand and automated, directly printed plates and options for plates are the same. The differences are that a polymer base plate construction is not embossable, a polymer base plate construction cannot be debossed on the outside plate edge, a polymer base plate construction rebounds to being flat when bent, and some digital printing methods will not work where metal is present such as the aluminum base material in some laser printers.

A transparent substrate or transparent top film can be preferably made from PVC or HDPE or any other polymer that is optically clear, durable and receptive to the colorant and substrate adhesive. The film can preferably be coated with the colorant and substrate adhesive. This film can be die cut on a low adhesion carrier film to the full license plate size. Rounded corners and bolt slots can be also die cut. Some portion of the graphics noted below can be preprinted during the die cutting operation. Some polymers can be directly printed using digital printers without the requirement for a colorant and substrate adhesive. It is also possible for the adhesion, between the base plate and the transparent substrate, not to require a colorant and substrate adhesive. For most polymers, digital printing methods and lamination processes the colorant and substrate adhesive will be required.

A base plate can be made from a durable polymer sheeting that normally has a top film of retroreflective sheeting laminated to polymer base plate. The polymer could be PVC, ABS, HDPE or any other of a large number of polymers or combinations or layers of polymers that meet certain jurisdictional requirements. The retroreflective sheeting can be coated with a substrate adhesive or a colorant and substrate adhesive. While other finishing films or coatings can be employed, most current plates use the retroreflective sheeting for night safety and readability. The polymer and top film can be die cut to size, in the USA 6 inches by 12 inches, the corners are rounded, and the bolt slots can also be die cut.

A finished license plate can have many different features that provide value to a jurisdiction. Many of the features do not add cost to the plate other than the additional colorant being used which is a large advantage to the invented plate that is produced in a full color digital printer. Some of the unique features are listed below including certain security features.

Optical Security Marks—These high security methods use retroreflective sheeting that has been modified using a laser that removes a small spot of the aluminum reflector coat behind the glass beads to form custom security marking that is specific to the jurisdiction. As the plate is rotated the markings appear and disappear.

Security Inks—Security inks are easy to deploy but hard to duplicate or change. Some inks only appear at certain illumination wave lengths and can be verified by using an illumination source with the correct wave length. Strong color shift inks change colors as the LP is viewed around its horizontal or vertical axis. Half tone graphics can be printed with non-visible patterns, such as using ultraviolet inks, that only appear under ultraviolet illumination Micro or Guilloche printing—Certain printing methods, such as Micro and Guilloche printing cannot be successfully coped on a copier nor are they easy to duplicate. These printing schemes will provide security with little additional cost or effort Micro-Tagents and Other covert Security Agents—Micro sized particles that have specific identification features, such as rings of colors, are mixed with the substrate polymer to identify a particular jurisdiction. There can also be printed patterns between substrate layers, other chemicals or any method that provides a feature not in common use. This method is covert and usually requires a laboratory to correctly identify legitimate LPs.

Electronically Readable Media—Electronically readable media has two important features in that it provides security while also providing a means of electronically transferring data. When the electronically read data is encrypted and otherwise secured it cannot be forged or used by anyone other than the LP holder. Forgery, duplication and tampering are meaningless if there is no way to beat this identification method.

Security Labels—Labels can be made from highly secured materials such as hologram, liquid crystal and retroreflective materials. These labels are some of the strongest deterrents to forgery, duplication and tampering of license plates. For extra security the labels can be made very thin where both the bottom side and top of the sticker are adhered to the reflective sheeting and transparent top film making intact removal almost impossible.

While all of the above security features do help prevent forgery, duplication and tampering a preferred solution is an electronically readable means such as the InfoTechCN LLC of Ramsey, Minn., USA, 2D code called the ITCode™. This code is electronically readable using low cost hardware, holds up to 1800 bytes of data in just over one square inch, has jurisdictional data and plate identification data which can be triple encrypted for the entire block of data as well as individual sections to provide privacy. The code does not add production or material costs to the LP. Other than a few security printing methods that prevent low level attempts at forgery or tampering, the ITCode™ is the only security method required for highly secure identification.

Production Security Seal—A printed or applied security label that has an encrypted machine readable marking that has a consecutive number which allows the individual tracking of every license plate being manufactured.

Registration Number—The registration numbers can be consecutive, read from a database or a custom such as a vanity plate. The individual characters can be kerned to maximize readability. Every individual or class of plates can have a different font, font size, font color or any other differentiating font property.

The bolt slot holes can be die cut, as examples, in either the metal or polymer base plates as well as the corners being rounded. Plate sizes can vary according to jurisdictional requirements.

Jurisdictional identification can have as many levels as required such as country, state, county, city, zip code or whatever divisions are specified.

Jurisdictional Logos such as flags, crests, monuments, or any other printable graphic can be included on the plate.

Vehicle and owner data, specific to a given registration, can be placed on the plate for highly secured identification.

A Color coded registration seal, commonly called a validation sticker, can be printed on the plate.

Vehicle classification symbols or text can be printed on the plate. Common classes are passenger vehicle, taxi, light truck, heavy truck, bus, ambulance, fire truck and the like.

Jurisdictional background graphics are a graphic representation of a given jurisdiction. A flag, scenic display, monument or any other graphic that is commonly recognizable for the jurisdiction is suitable. The printing of all graphics for each individual plate means that many different designs could be available to suit the owner. This option is also great for personalized or vanity plates that provide a revenue source for the jurisdiction.

Machine Readable Means such as the ITC 2D barcode called the ITCode™ helps prevent forgery, duplication and tampering. This code is electronically readable using low cost hardware, holds up to 1800 bytes of data in just over one square inch, has jurisdictional data, plate identification data, vehicle and owner data, jurisdictional data and any other data required. The ITCode™ can be triple encrypted for the entire block of data as well as individual sections to provide privacy. The code does not add production or material costs to the LP. Other than a few security printing methods that prevent low level attempts at forgery or tampering, the ITCode™ is the only security method required for highly secure identification.

The production of the driver's license and Identification card (card) and license plate and Identification plate (plate) can be accomplished by both hand executed operations and/or by automated means. This dual capability is a development of the innovative process discussed here within. Note that for hand operation, both the card and plate, only a commercially available digital printer and a hand laminator are required to produce each. The illustrations within FIGS. 31 and 32 are for illustrative purposes of an automated production means.

Figure 31:
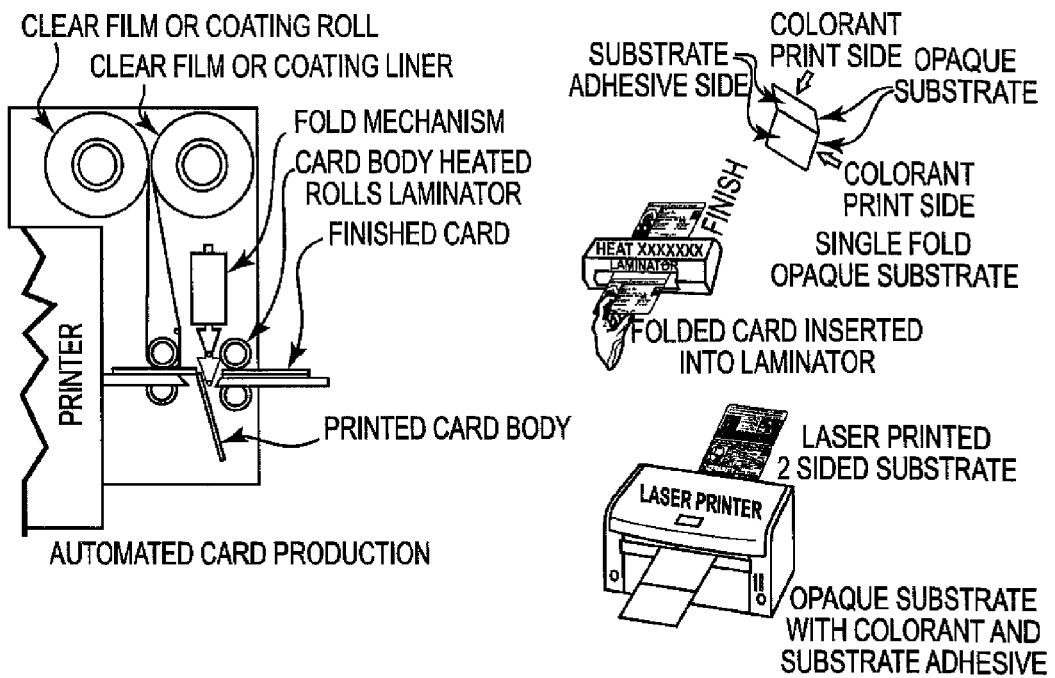
FIG. 31 shows a card production system.

As shown in FIG. 31, an example of a manual card production means is shown, which process is for a single fold, opaque substrate driver's license card. The opaque substrate is preferably made from die cut Teslin (3.375 inches wide by 4.250 inches long and 0.014 inches thick without adhesive/s) with a colorant adhesive on the print side and a substrate adhesive on the folded back side. The opaque substrate/s can be placed in a OKI C6050 laser printer optional tray with the print side up. The printer uses the post script printer language to provide quality graphics for both the front and back of the card including a very accurate ITCode™ 2D Barcode. Both the colorant and substrate adhesive soften in the laser printer but do not fully tackify preventing sticking or transferring to the fuser roller but allowing the toner to sink into the colorant adhesive. The printed opaque substrates are folded once on the die cut score line and fed into a hand laminator that has temperature control available. The finished card exits the laminator with the colorant adhesive continuing to build a crystalline structure, activated by the heat, which will protect the printed graphics. A double fold opaque and transparent substrates, with or without tear strips, can be all printed as the single fold, opaque substrate. The single pass, front and back laser printing is on the colorant adhesive side. The card, once printed, can be folded once or twice, dependant of the particular card construction and fed through the laminator as before. If the card has a tear strip, the tear strips are removed after lamination. The card graphics may be protected by the colorant adhesive or the transparent substrate, depending on the card construction. A few card constructions, where the substrate accepts the digital printer colorant, may not require the colorant adhesive.

The example automated card production means shown in FIG. 31 is for a single fold, opaque substrate driver's license card. The opaque substrate is preferably made from die cut Teslin (3.375 inches wide by 4.250 inches long and 0.014 inches thick without adhesive/s) with a colorant adhesive on the print side and a substrate adhesive on the folded back side. The opaque substrate/s is/are placed, for example, within a OKI C6050 laser printer optional tray with the print side up. The printer uses the post script printer language to provide quality graphics for both the front and back of the card including a very accurate ITCode™ 2D Barcode. Both the colorant and substrate adhesive soften in the laser printer but do not fully tackify preventing sticking or transferring to the fuser roller but allowing the toner to sink into the colorant adhesive. At the printer exit end a clear film label or hot stamp clear coating film laminator, a card Folder and a heat pressure laminator are provided to automate the card finishing process. The clear film label or hot stamp clear coating film laminator is only used on single fold, opaque substrates where an additional layer of protection is required for either or both the card's front and back. The clear film label is a die cut clear polymer carried on a low adhesion liner. The card edge is detected and the liner is advanced to align the label with the card front or back side. The label is then placed on the card using a lamination roller or tamping device that may or may not be heated. The hot stamp clear coating film is hard resin, carried on a film liner that only will adhere to the card surface where heat is applied and any remaining resin stays with the carrier film. The heat may be applied using a thermal transfer print head, a heated stamp the exact size and shape of the card or a heated roller. For cards that do not require the protective layer, the label/film laminator is removed. The next stage is folding the card. As the card advances the folding mechanism protrudes downward to force the card's leading edge downward and then is retracted allowing the leading edge to be folded towards the back and finally enter the card body heated rolls laminator as a folded card. Double folded card constructions will not require protective top film lamination and will require a double folding process before entering the card body heated rolls laminator as a double folded card. If the card has a tear strip, the tear strips are removed after lamination by hand. The card graphics may be protected by the colorant adhesive or the transparent substrate, depending on the card construction. A few card constructions, where the substrate accepts the digital printer colorant, may not require the colorant adhesive.

Figure 32:
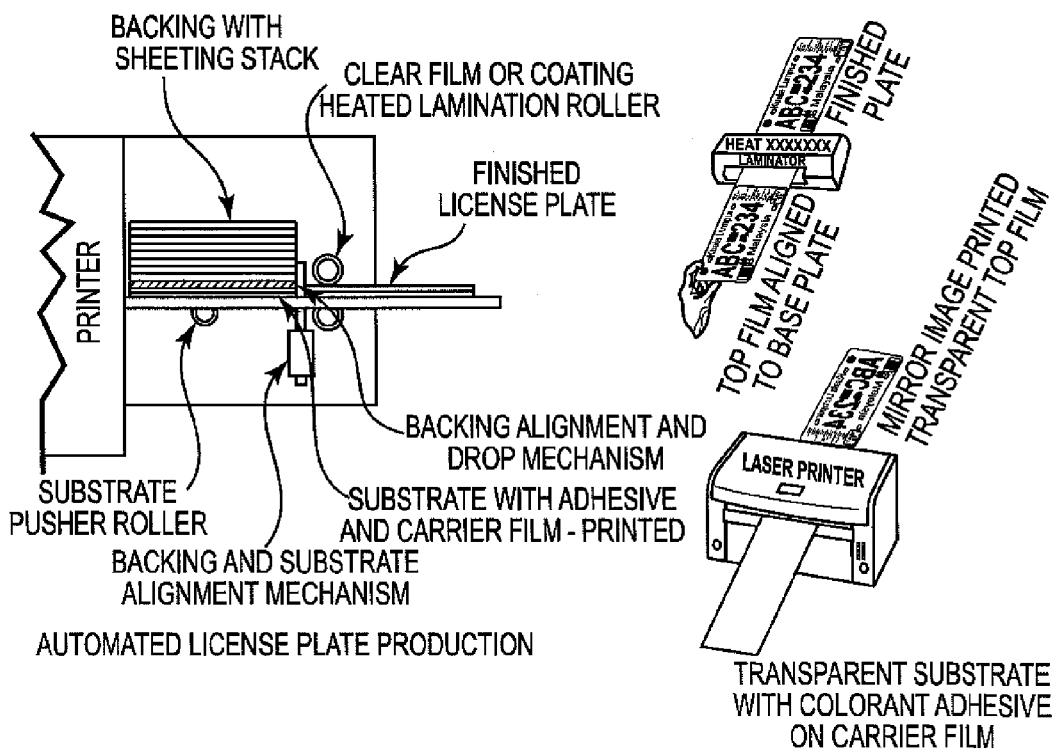
FIG. 32 shows a plate production system.

As shown in FIG. 32, an example of a manual plate production system is shown, which process starts with a transparent substrate top film. The transparent substrate that can be preferably made from die cut PVC (for example, 6.00 inches wide by 12.00 inches long and 0.010 inches thick without adhesive/s) with a colorant and substrate adhesive on the print side and a low adhesion carrier film on the back side. The transparent substrate/s is preferably placed, for example, in an OKI C6050 laser printer optional tray with the print side up. The printer can use the Post Script printer language to provide quality graphics including a very accurate ITCode™ 2D Barcode. The colorant and substrate adhesive softens in the laser printer but does not fully tackify preventing sticking or transferring to the fuser roller but allowing the toner to sink into the colorant adhesive. The printed transparent substrate print side is aligned with a base plate and fed into a hand laminator that has temperature control available to finish the license plate. The license plate can be made in one pass through the printer using a base plate that has retroreflective sheeting with a top film that is compatible with durable solvent ink jet colorants. The plate is finished after the printing cycle.

The example automated plate production system shown in FIG. 32 begins with a transparent substrate top film. The transparent substrate is preferably made from die cut PVC (6.00 inches wide by 12.00 inches long and 0.010 inches thick without adhesive/s) with a colorant and substrate adhesive on the print side and a low adhesion carrier film on the back side. The transparent substrate/s is placed, for example, in an OKI C6050 laser printer optional tray with the print side up. The printer can use the Post Script printer language to provide quality graphics including a very accurate ITCode™ 2D Barcode. The colorant and substrate adhesive soften in the laser printer but does not fully tackify preventing sticking or transferring to the fuser roller but allowing the toner to sink into the colorant adhesive. At the printer exit end a stack of base plates with retroreflective sheeting are held with film or coating side down and a heat pressure laminator are provided to automate the plate finishing process. The transparent substrate, printing side up, can be detected and advanced to align with the leading edge of the base plate. The base plate is then preferably placed on the transparent substrate using the backing and drop mechanism. The aligned base plate and transparent substrate are moved into the plate body heated rolls laminator by the substrate pusher roller and kept in alignment by the backing and alignment mechanism. The plate graphics are protected by the transparent substrate. A few plate constructions, where the retroreflective top film accepts the digital printer colorant, may not require the colorant adhesive.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The materials, constructions, methods and configurations shown and described may differ depending on the chosen performance characteristics and physical characteristics of the card or plate and their use. For example, the types of materials, constructions, security features, electronically readable data methods used may differ. The descriptions here within are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

The invention claimed is:

1. A method of making an identification card comprising the steps of:
   providing a card substrate including first and second surfaces, the card substrate being generally shaped to include at least a plurality of substrate portions that are divided from one another by a fold line so that at least two portions can overly one another in a final card construction, the first surface having a heat activated substrate adhesive, with an activation temperature, and the second surface having a heat activated colorant adhesive that comprises a polymer suitable for adhering with colorant and for increasing abrasion resistance of second surface of the card, wherein at least one portion of the substrate is opaque;
   printing colorant on the colorant adhesive of at least two of the plurality of substrate portions on the second surface side, of at least one of the first and second said substrate surfaces, the colorant providing identification information of an individual, the printing including a step of adhering the colorant to the colorant adhesive by applying heat and pressure to the colorant as applied to the colorant adhesive, the applied heat being below the activation temperature of the substrate adhesive but of a level that softens the colorant adhesive for driving the colorant into the softened colorant adhesive while advancing the card substrate through a printing device;
   folding a first portion of the card substrate with respect to a second portion of the card substrate along the fold line so as to overly one another with the substrate adhesive of at least one portion being inward and located between folded substrate portions, wherein at least one of the first and second portions as folded is the opaque portion; and
   laminating the folded sections together in a heat/pressure laminator by heating the substrate adhesive above its activation temperature and applying pressure to secure the first and second portions of the card together.

2. The method of claim 1, wherein the substrate includes rounded corners at each substrate portion and adjacent to the fold line so that during the folding step the rounded corners align with one another.

3. The method of claim 1, wherein the fold line of the substrate comprises a line of weakening and the folding step is conducted along the line of weakening.

4. The method of claim 3, wherein the line of weakening comprises a score line provided along the second surface.

5. The method of claim 1, wherein the opaque surface is provided by at least one of an opaque coating and an opaque film so that after the folding step, an opaque identification card is created.

6. The method of claim 1, further comprising a second folding step prior to the laminating step with the second folding step folding a third portion of the card substrate to overly the first and second substrate portions as were folded together in the first folding step.

7. The method of claim 1, wherein the printing step is conducted using a laser printer.

8. The method of claim 1, wherein the printing step includes the printing of additional data to at least one of the card portions, the additional data including at least one of a two-dimensional code, a photo, and biometric data.

\* \* \* \* \*